US011724877B2

(12) United States Patent
Fosnight et al.

(10) Patent No.: US 11,724,877 B2
(45) Date of Patent: Aug. 15, 2023

(54) UNIVERSAL GRIPPER FOR TOTE AND SUB-TOTE TRANSPORT

(71) Applicant: Walmart Apollo, LLC, Bentonville, AR (US)

(72) Inventors: William J. Fosnight, Windham, NH (US); Martin R. Elliott, Bedford, NH (US); John G. Lert, Jr., Wakefield, MA (US)

(73) Assignee: Walmart Apollo, LLC, Bentonville, AR (US)

( * ) Notice: Subject to any disclaimer, the term of this patent is extended or adjusted under 35 U.S.C. 154(b) by 288 days.

(21) Appl. No.: 17/081,836

(22) Filed: Oct. 27, 2020

(65) Prior Publication Data

US 2021/0039882 A1 Feb. 11, 2021

Related U.S. Application Data

(63) Continuation of application No. 16/058,065, filed on Aug. 8, 2018, now Pat. No. 10,815,057.

(60) Provisional application No. 62/542,551, filed on Aug. 8, 2017.

(51) Int. Cl.

| | |
|---|---|
| ***G06F 7/00*** | (2006.01) |
| ***B65G 1/04*** | (2006.01) |
| ***B66C 1/66*** | (2006.01) |
| ***B66C 1/44*** | (2006.01) |
| ***B65G 47/91*** | (2006.01) |
| ***B25J 15/00*** | (2006.01) |
| ***B65G 1/137*** | (2006.01) |

(52) U.S. Cl.

CPC ........ *B65G 1/0464* (2013.01); *B25J 15/0047* (2013.01); *B65G 1/1373* (2013.01); *B65G 47/912* (2013.01); *B66C 1/445* (2013.01); *B66C 1/663* (2013.01); *B65G 2201/0258* (2013.01)

(58) Field of Classification Search

CPC .. B65G 1/0464; B65G 1/1373; B65G 47/912; B65G 2201/0258; B25J 15/0047; B66C 1/445; B66C 1/663

USPC .......................................... 700/213–214, 218

See application file for complete search history.

(56) References Cited

U.S. PATENT DOCUMENTS

| | | | |
|---|---|---|---|
| 5,179,329 | A | 1/1993 | Nishikawa et al. |
| 5,472,309 | A | 12/1995 | Bernard et al. |
| 5,642,976 | A | 7/1997 | Konstant |

(Continued)

FOREIGN PATENT DOCUMENTS

| | | |
|---|---|---|
| DE | 3814914 | 11/1989 |
| DE | 4229215 | 3/1993 |

(Continued)

OTHER PUBLICATIONS

Response to Office Action filed Jun. 4, 2021, with English translation of claims as amended therein, in Japanese Patent Application No. 2020-506972.

(Continued)

*Primary Examiner* — Yolanda R Cumbess

(74) *Attorney, Agent, or Firm* — Fitch, Even, Tabin & Flannery LLP

(57) ABSTRACT

A universal gripper is disclosed for transferring totes and sub-totes, for example in an order fulfillment center. The universal gripper includes adjustable tines and pins capable of being positioned to engage within slots in the different configurations of totes and sub-totes.

20 Claims, 30 Drawing Sheets

112
110
102a
X
102a
100
114
118
114
112
112
112
y

(56) References Cited

U.S. PATENT DOCUMENTS 6,289,260 B1 * 9/2001 Bradley ............... B65G 1/1376 414/280
7,591,630 B2 9/2009 Lert, Jr.
7,861,844 B2 1/2011 Hayduchok et al.
7,894,932 B2 2/2011 Mountz et al.
7,894,933 B2 2/2011 Mountz et al.
7,991,505 B2 8/2011 Lert, Jr. et al.
8,104,601 B2 1/2012 Hayduchok et al.
8,276,740 B2 10/2012 Hayduchok et al.
8,311,902 B2 11/2012 Mountz et al.
8,425,173 B2 4/2013 Lert et al.
8,447,665 B1 5/2013 Schoenharl et al.
8,483,869 B2 7/2013 Wurman et al.
8,527,325 B1 9/2013 Atreya et al.
8,594,835 B2 11/2013 Lert et al.
8,622,194 B2 1/2014 DeWitt et al.
8,626,335 B2 1/2014 Wurman et al.
8,694,152 B2 4/2014 Cyrulik et al.
8,718,814 B1 5/2014 Clark et al.
8,740,538 B2 6/2014 Lert et al.
8,831,984 B2 9/2014 Hoffman et al.
8,892,240 B1 11/2014 Vliet et al.
8,965,562 B1 2/2015 Wurman et al.
8,972,045 B1 3/2015 Mountz et al.
8,983,647 B1 3/2015 Dwarakanath et al.
9,008,828 B2 4/2015 Worsley
9,008,829 B2 4/2015 Worsley
9,008,830 B2 4/2015 Worsley
9,020,632 B2 4/2015 Naylor
9,037,286 B2 5/2015 Lert
9,051,120 B2 6/2015 Lert et al.
9,096,375 B2 8/2015 Lert et al.
9,111,251 B1 8/2015 Brazeau
9,129,250 B1 9/2015 Sestini et al.
9,139,363 B2 9/2015 Lert
9,242,798 B2 1/2016 Guan
9,260,245 B2 2/2016 Este et al.
9,321,591 B2 4/2016 Lert et al.
9,330,373 B2 5/2016 Mountz et al.
9,334,113 B2 5/2016 Naylor
9,334,116 B2 5/2016 DeWitt et al.
9,378,482 B1 6/2016 Pikler et al.
9,423,796 B2 8/2016 Sullivan et al.
9,428,295 B2 8/2016 Vliet et al.
2005/0047895 A1 3/2005 Lert
2006/0257236 A1 11/2006 Stingel, III et al.
2007/0127691 A1 6/2007 Lert, Jr.
2010/0076591 A1 3/2010 Lert, Jr.
2010/0316468 A1 12/2010 Lert et al.
2010/0316469 A1 12/2010 Lert et al.
2010/0316470 A1 12/2010 Lert et al.
2010/0322746 A1 12/2010 Lert
2010/0322747 A1 12/2010 Lert et al.
2012/0101627 A1 4/2012 Lert
2012/0186942 A1 7/2012 Toebes et al.
2012/0195720 A1 8/2012 Sullivan et al.
2013/0246229 A1 9/2013 Mountz et al.
2014/0088758 A1 3/2014 Lert et al.
2014/0212249 A1 7/2014 Kawano
2014/0271063 A1 9/2014 Lert et al.
2014/0288696 A1 9/2014 Lert
2014/0308098 A1 10/2014 Lert et al.
2015/0266672 A1 9/2015 Lert et al.
2015/0286967 A1 10/2015 Lert et al.
2015/0375938 A9 12/2015 Lert et al.
2016/0016733 A1 1/2016 Lert
2016/0075512 A1 3/2016 Lert
2016/0122161 A1 * 5/2016 Mannari ................ B66C 1/101 700/275
2017/0043953 A1 2/2017 Battles et al.
2017/0158430 A1 6/2017 Raizer
2017/0174431 A1 * 6/2017 Borders ............... B65G 1/0492
2017/0267452 A1 9/2017 Goren et al.
2017/0297820 A1 10/2017 Grinnell et al.
2017/0330142 A1 11/2017 Kanellos et al.

FOREIGN PATENT DOCUMENTS

EP 2732926 5/2014
EP 2650237 B1 11/2014
EP 2651786 B1 5/2016
EP 2651787 B1 5/2016
JP S6151482 3/1986
JP H2-80628 6/1990
JP H3-36786 4/1991
JP 2012229589 11/2012
JP 2014100757 6/2014
WO 2005097550 10/2005
WO 2016172793 A1 11/2016
WO 2016199033 A1 12/2016
WO 2017064401 A1 4/2017

OTHER PUBLICATIONS

English language Abstract for WO2017064401 published Apr. 20, 2017.
International Search Report and Written Opinion dated Oct. 30, 2018 in International Patent Application No. PCT/US2018/045724.
English language Abstract of DE3814914 published Nov. 16, 1989.
English language Abstract of DE4229215 published Mar. 11, 1993.
English language machine translation of JPS6151482 published Mar. 13, 1986.
Office Action dated Jan. 16, 2020 in U.S. Appl. No. 16/058,065.
Response to Office Action filed Jun. 16, 2020 in U.S. Appl. No. 16/058,065.
Notice of Allowance and Fee(s) Due dated Jul. 2, 2020 in U.S. Appl. No. 16/058,065.
Office Action dated Jan. 4, 2021 in Japanese Patent Application No. 2020-506972.
English language Abstract for JP2014100757 published Jun. 5, 2014.
English language Abstract and Machine Translation for JP2012229589 published Nov. 22, 2012.
Machine Translation for JPH2-80628 published Jun. 21, 1990.
Machine Translation for JPH3-36786 published Apr. 10, 1991.
Response to Office Action dated Jul. 1, 2022, with English language claims as amended therein, in Japanese Patent Application No. 2020-506972.
Office Action dated Jan. 4, 2022 in Japanese Patent Application No. 2020-506972.

* cited by examiner

UNIVERSAL GRIPPER FOR TOTE AND SUB-TOTE TRANSPORT

PRIORITY CLAIM

The present application is a continuation of U.S. patent application Ser. No. 16/058,065, filed Aug. 8, 2018, entitled "UNIVERSAL GRIPPER FOR TOTE AND SUB-TOTE TRANSPORT," to be issued as U.S. Pat. No. 10,815,057, which application claims priority to U.S. Provisional Patent Application No. 62/542,551, filed on Aug. 8, 2017, entitled "UNIVERSAL GRIPPER FOR TOTE AND SUB-TOTE TRANSPORT," which application is incorporated by reference herein in its entirety.

BACKGROUND

An order-fulfillment system for use in supply chains, for example in retail supply chains, may fulfill orders for individual goods or product units, also referred to herein as "eaches." Such eaches are transported within a facility such as a distribution center or retail store within containers, referred to herein as totes. Such totes may include smaller containers, referred to herein as sub-totes, to allow different goods to be stored and transported together within a tote. A system is needed for the efficient transfer of totes, and the transfer of sub-totes between totes.

DETAILED DESCRIPTION

Embodiments of the present technology will now be described with reference to the figures, which in general relate to a universal gripper for transferring totes and sub-totes, for example in an order fulfillment center. The universal gripper includes adjustable pins and tines capable of being positioned to engage within slots in the different configurations of totes and sub-totes. The tines include tabs, referred to herein as lifting tabs. Once the lifting tabs on the tines pass through the slots on the sub-totes, the tines are translated apart so that the lifting tabs lock the sub-tote on the tines. The universal gripper may thereafter transport the tote or sub-tote to a new position secured on the universal gripper.

It is understood that the present invention may be embodied in many different forms and should not be construed as being limited to the embodiments set forth herein. Rather, these embodiments are provided so that this disclosure will be thorough and complete and will fully convey the invention to those skilled in the art. Indeed, the invention is intended to cover alternatives, modifications and equivalents of these embodiments, which are included within the scope and spirit of the invention as defined by the appended claims. Furthermore, in the following detailed description of the present invention, numerous specific details are set forth in order to provide a thorough understanding of the present invention. However, it will be clear to those of ordinary skill in the art that the present invention may be practiced without such specific details.

The terms "top" and "bottom," "upper" and "lower" and "vertical" and "horizontal" as may be used herein are by way of example and illustrative purposes only, and are not meant to limit the description of the invention inasmuch as the referenced item can be exchanged in position and orientation. Also, as used herein, the terms "substantially" and/or "about" mean that the specified dimension or parameter may be varied within an acceptable manufacturing tolerance for a given application. In one embodiment, the acceptable manufacturing tolerance is ±0.25%.

Figure 1A:
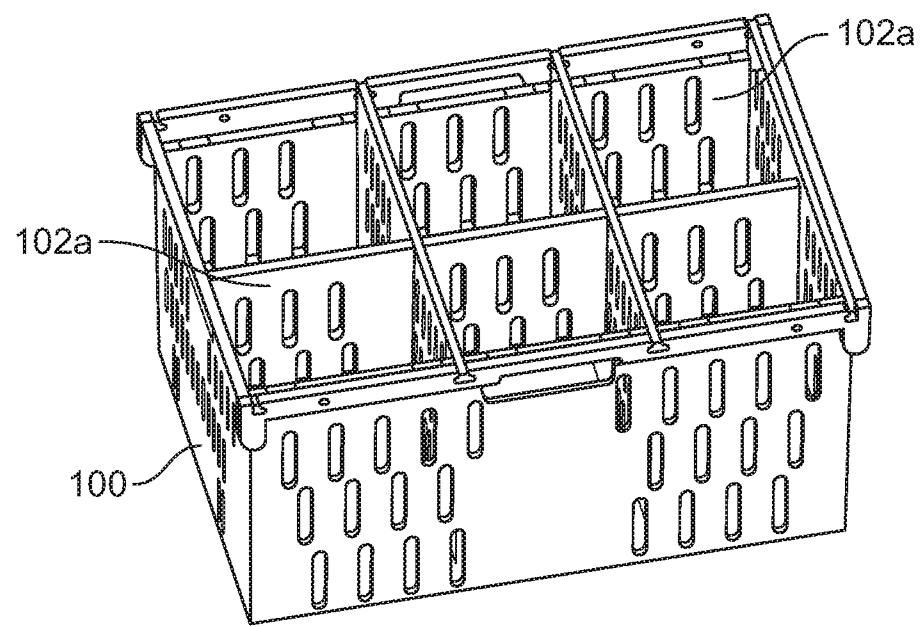
FIGS. 1A-1C show Sub-tote and tote configurations.
Figure 1B:
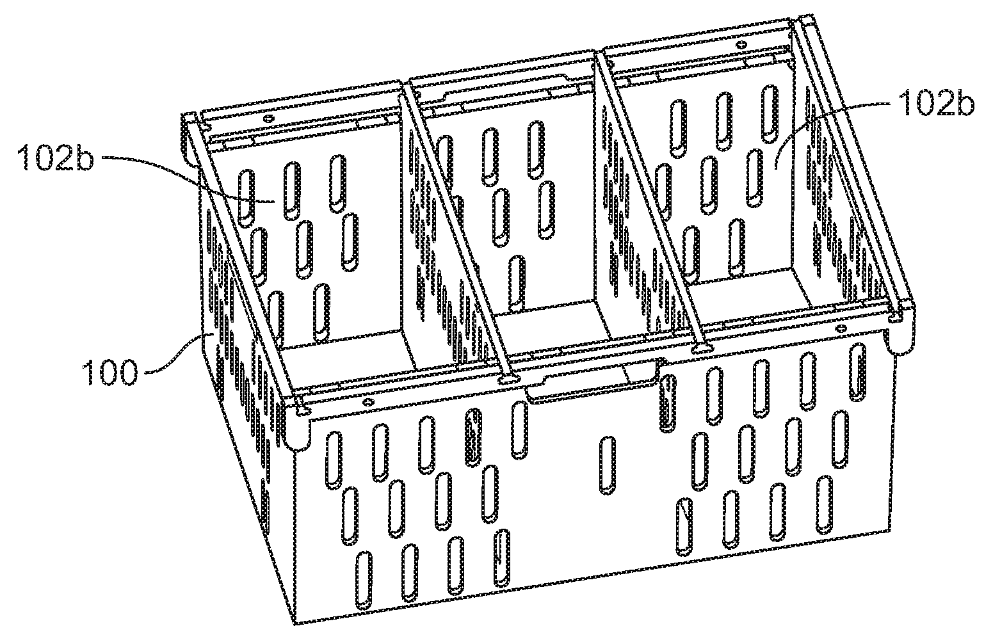
Figure 1C:
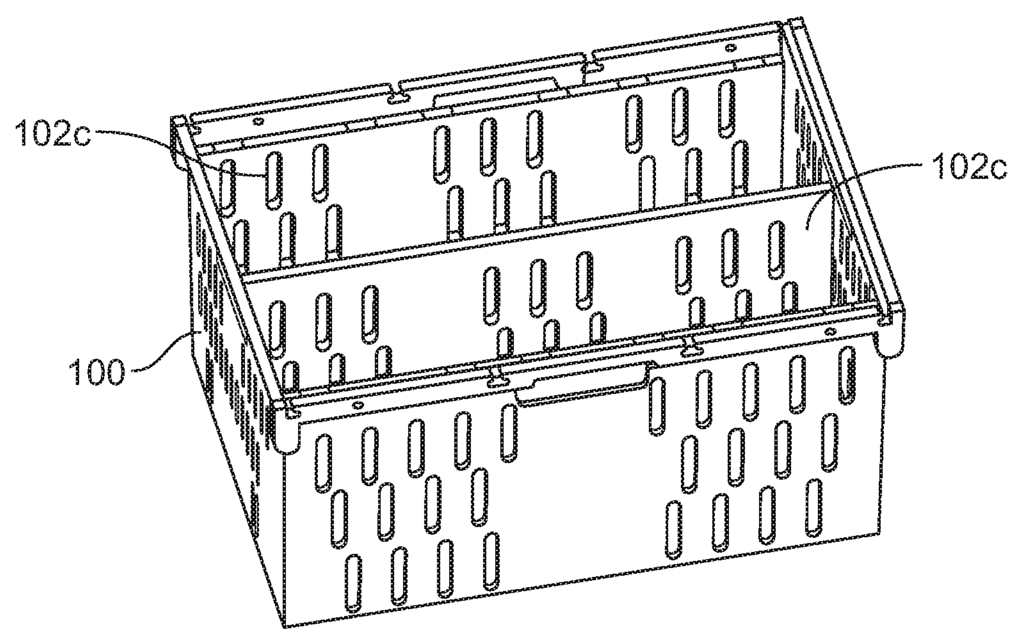

FIGS. 1A-1C illustrate totes 100 including different configurations of sub-totes 102. FIG. 1A shows an example of six small sub-totes 102*a* filling the available area of tote 100. FIG. 1B shows an example of three medium sized sub-totes 102*b* filling the available area of tote 100. FIG. 1C shows an example of two large sub-totes 102*c* filling the available area of tote 100. Totes 102*a* are referred to herein as one-sixth sub-totes 102*a*, totes 102*b* are referred to herein as one-third sub-totes 102*b* and totes 102*c* are referred to herein as one-half sub-totes 102*c*. There may be other configurations of sub-totes 102 within tote 100, such as for example one-eighth sub-totes comprising eight sub-totes which fill the available area of tote 100. The tote 100 may further be used with no sub-totes 102.

The universal gripper of the present technology is able to manipulate (including to grip and transfer) the sub-totes 102 of any configuration, as well as the tote 100 as a whole. As explained below, the universal gripper includes tines which engage within slots 120 provided in the perimeter of tote 100 and different configurations of sub-totes 102. This minimizes the structure within the tote 100 and sub-totes 102 needed for operation with the universal gripper, and maximizes the space within the tote 100 and sub-totes 102 available for stored goods.

Figure 2:
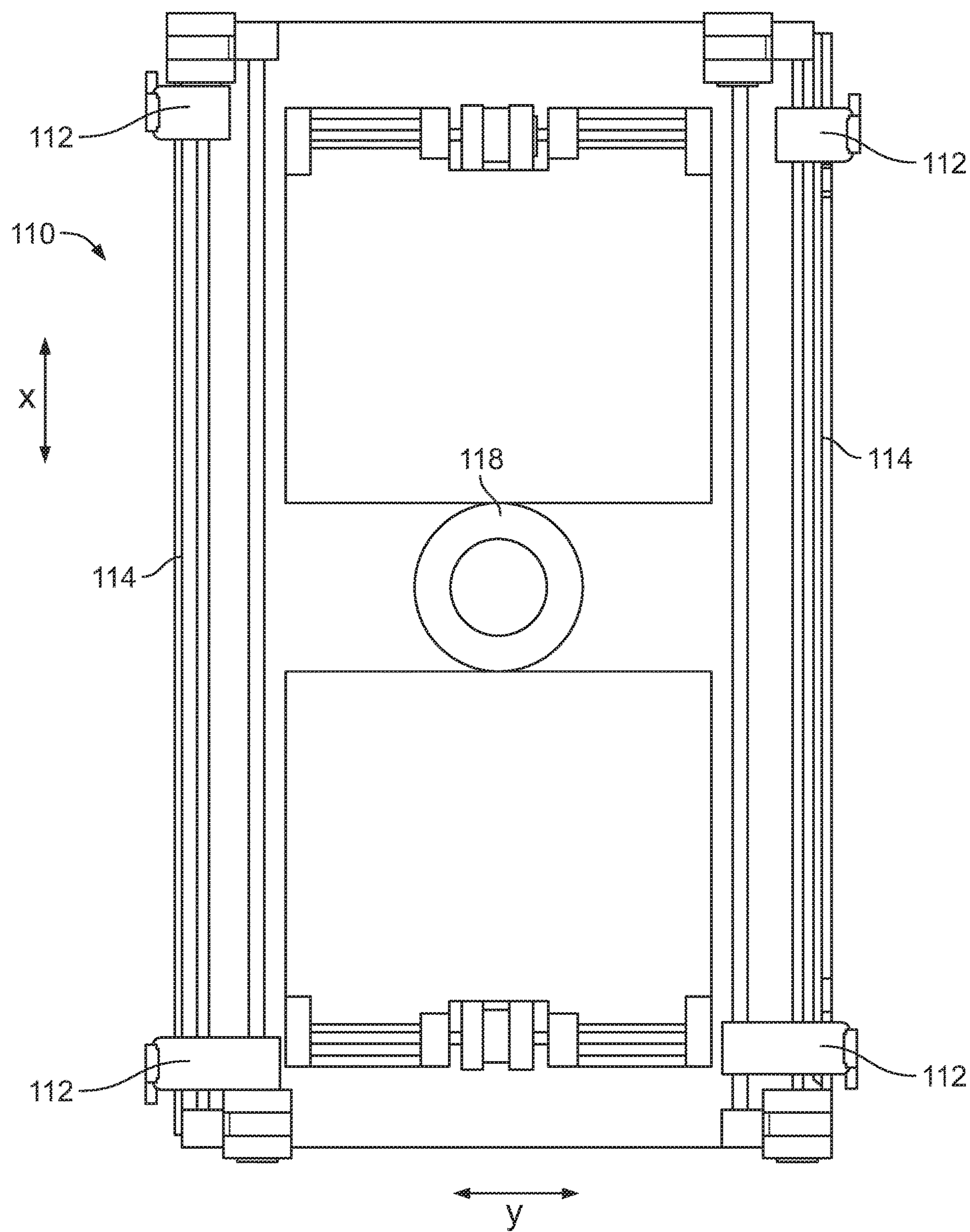
FIG. 2 shows a top view of universal gripper.
Figure 3:
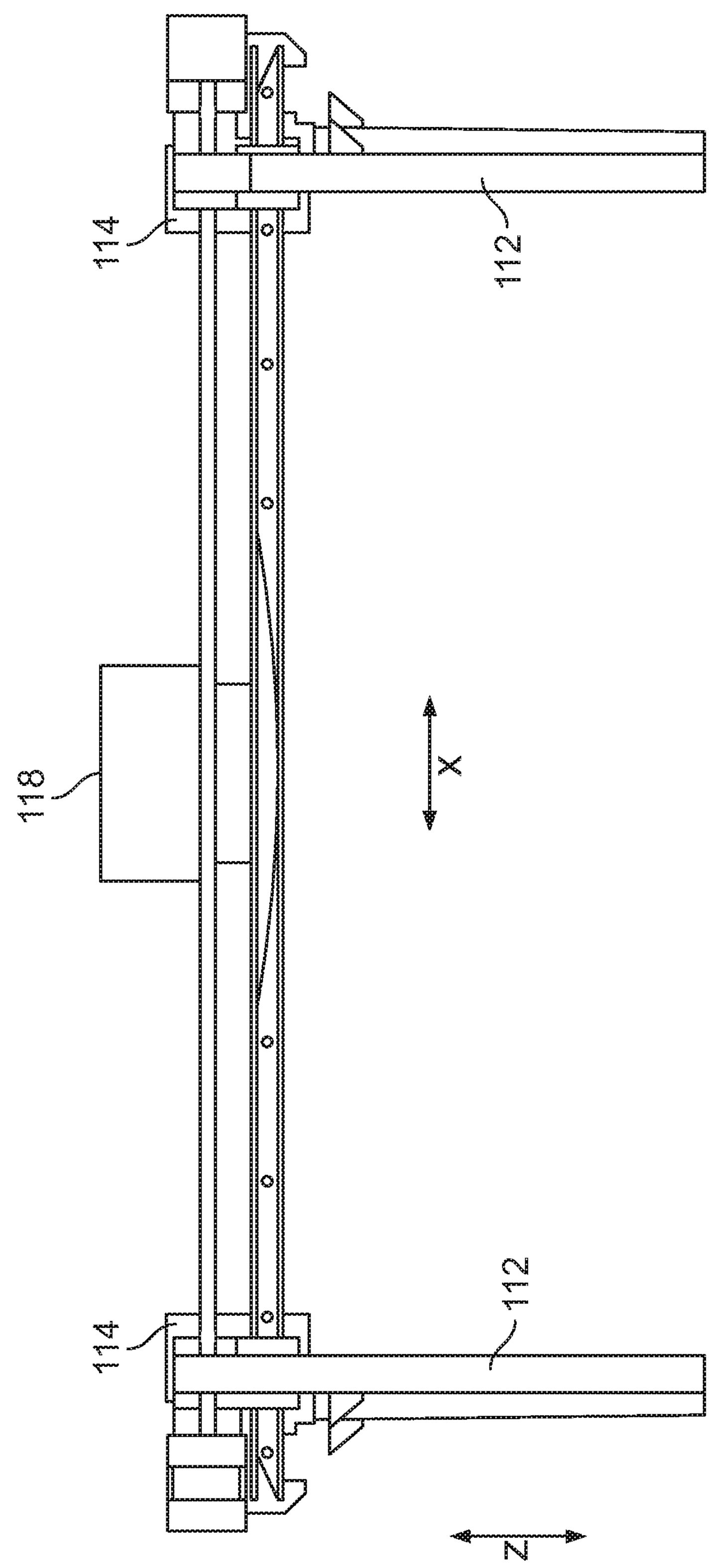
FIG. 3 shows a front view of universal gripper.
Figure 4:
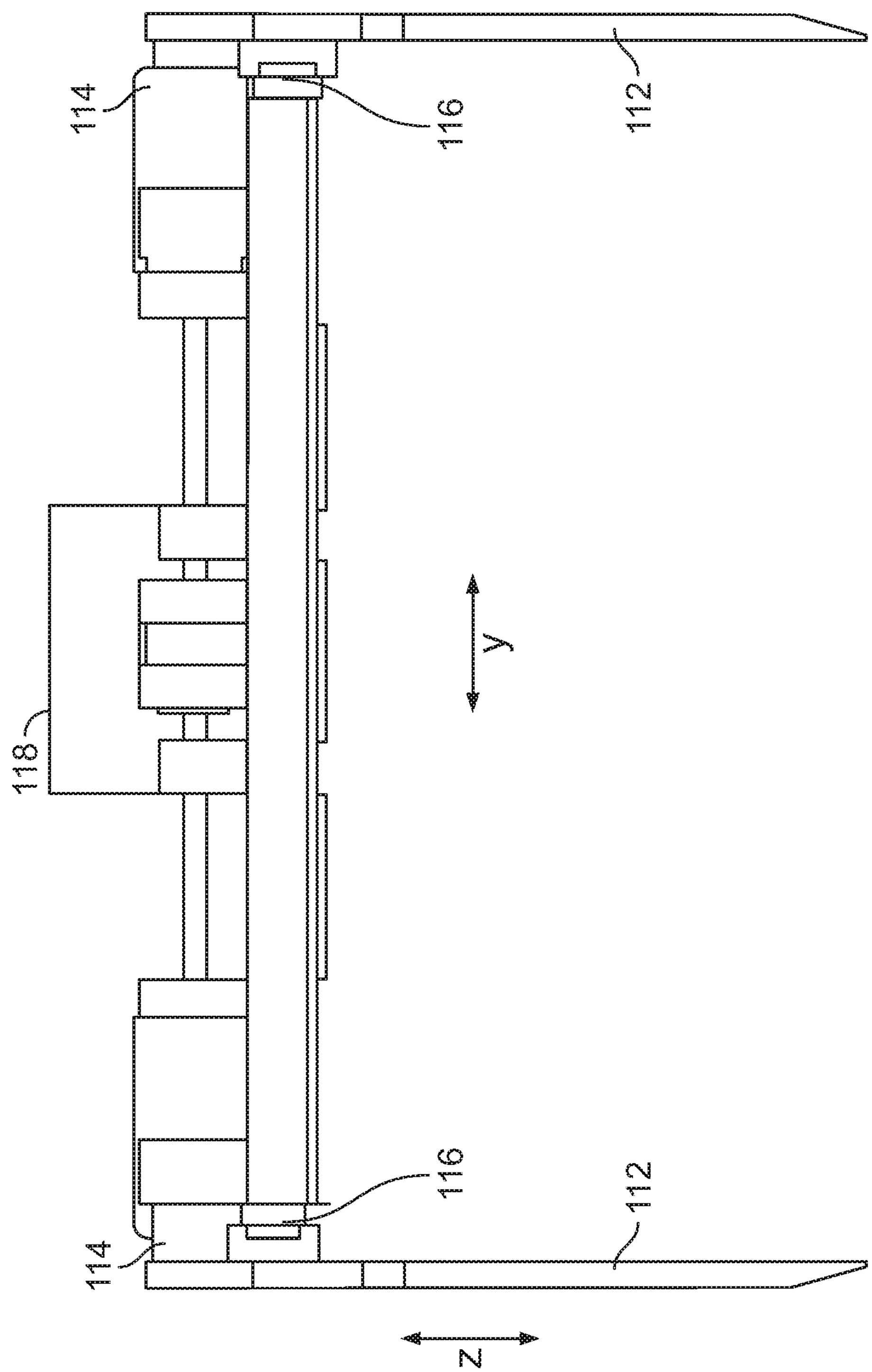
FIG. 4 shows an end view of universal gripper.

FIGS. 2, 3 and 4 are top, side and end views, respectively of a universal gripper 110 according to an embodiment of the present technology including projecting pieces in the form of tines 112 for engaging within slots in the tote 100 or sub-totes 102. The tines 112 extend down (along z-axis) into the space between an outer wall of the sub-totes 102 and an inner wall of the full tote 100. In particular, the sidewalls of the tote 100 are provided with a draft angle so that the tote sidewalls slant outward slightly from a bottom to a top of the sidewalls. The draft angle of the sidewalls in tote 100 provide space for receiving the tines 112, while allowing the bottom footprint of the sub-totes 102 to approximate the bottom footprint of the full tote 100.

The tines 112 are mounted on a frame 114. In particular, a first side of the frame includes first and second tines 112 driven to move along the first side of the frame (along the x-axis) by first and second motors 116 (one such motor labeled in FIG. 4). Each of the motors 116 may for example be a servomotor. In one example, the each of the first and second tines 112 on the first side of frame 114 may be attached to a ball slide and driven by parallel leadscrews 122 (FIG. 6) by the motors 116. The translating tines 112 in the first side of frame 114 may alternatively be driven with toothed time belts. A second side of the frame 114, opposed to the first side, may include a second pair of tines, also driven to move along the second side by a pair of motors 116 as described above for the first side of frame 114.

A processor (not shown) controls the motors 116 to drive the translating tines 112 along the sides of the frame 114 to appropriately space apart the translating tines 112 to grip the tote 100 and sub-totes 102 for any sub-tote configuration. In particular, the tines may be driven to a position so as to align with the slots in the outer walls of the tote 100 and the slots in the outer walls of the sub-totes 102 of any sub-tote configuration. Also, as explained below, the translating tines in each side may be driven to shift once positioned within the slots of a sub-tote to engage the sub-tote for lifting.

In embodiments, the tines 112 remain a fixed distance from each other along the y-axis. However, it is conceivable that the tines 112 on opposed sides of the frame 114 move toward or away from each other in further embodiments. The gripper 110 includes a hub 118 which mounts to a shaft 158 (shown in FIG. 15) capable of translating the gripper 110 and rotating the gripper 110 at least 180° about an axis through the shaft and hub 118.

Figure 5A:
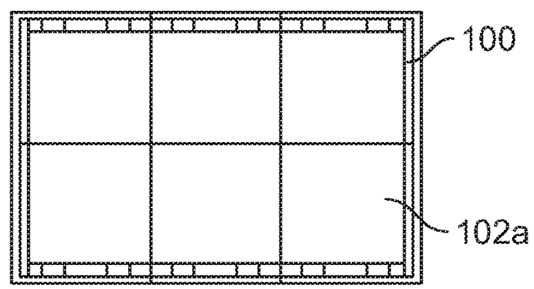
FIGS. 5A-5G show top view of sub-totes and corresponding universal grippers.
Figure 5C:
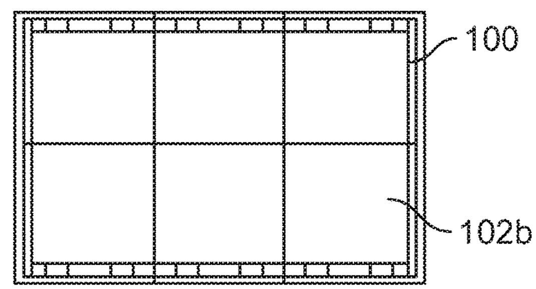
Figure 5B:
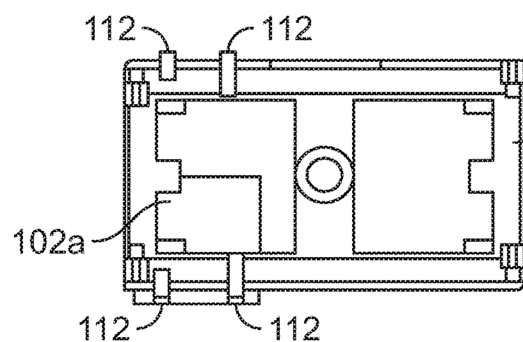
Figure 5D:
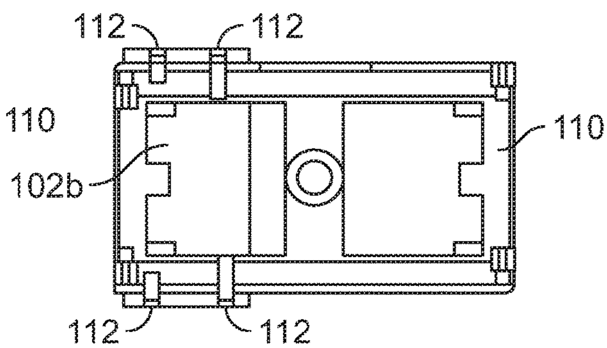

FIGS. 5A-5F are top views showing the positioning of the tines 112 for gripping the respective configurations of sub-totes 102. FIG. 5G shows the positioning of the tines 112 for gripping the tote 100. In particular, FIG. 5A shows a tote 100 filled with one-sixth sub-totes 102*a*. FIG. 5B shows the orientation of the gripper 110 and tines 112 for removing a one-sixth sub-tote 102*a* from the tote 100 shown in FIG. 5A. Owing to the small size of the one-sixth sub-totes 102*a*, the tines 112 engage a single side of a sub-tote 102*a* for transport of the sub-tote 102*a*. The sub-tote 102*a* shown in FIG. 5B is gripped by a pair of tines 112 on one edge (bottom edge in FIG. 5B) of the frame 114. If the sub-tote 102*a* were instead seated within the tote 100 in the other position along the y-axis, the sub-tote 102*a* would be gripped by a pair of tines 112 on the opposite edge (top edge in FIG. 5B) of the frame 114.

FIG. 5C shows a tote 100 filled with one-third sub-totes 102*b*. FIG. 5D shows the orientation of the gripper 110 and tines 112 for removing a one-third sub-tote 102*b* from the tote 100 shown in FIG. 5C. As the sub-tote 102*b* spans the entire width of the tote 100 along the y-axis, the sub-tote 102*b* may be gripped by a first pair of tines 112 along a first edge of frame 114, by a second pair of tines 112 along a second edge of frame 114 opposed to the first edge, or by both pairs of tines 112 along the two opposed edges.

Figure 5E:
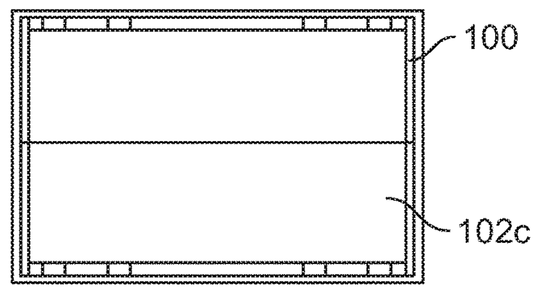
Figure 5F:
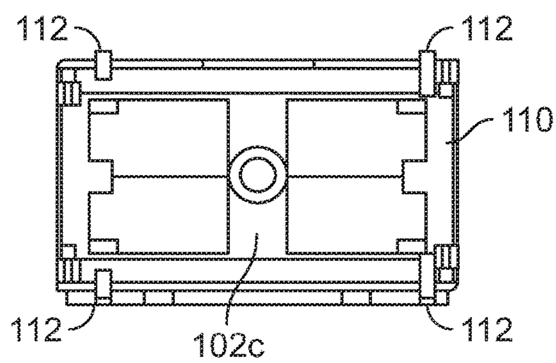
Figure 5G:
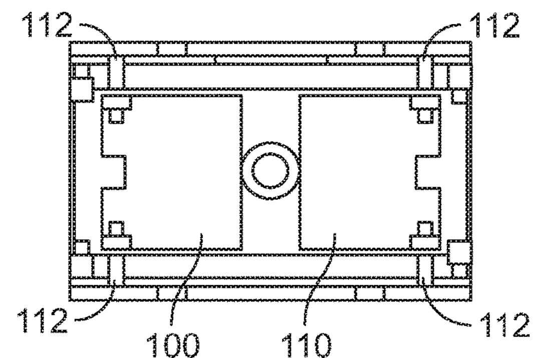

FIG. 5E shows a tote 100 filled with one-half sub-totes 102*c*. FIG. 5F shows the orientation of the gripper 110 and tines 112 for removing a one-half sub-tote 102*c* from the tote 100 shown in FIG. 5E. The sub-tote 102*c* shown in FIG. 5F is gripped by a pair of tines 112 on one edge (bottom edge in FIG. 5F) of the frame 114. If the sub-tote 102*c* were instead seated within the tote 100 in the other position along the y-axis, the sub-tote 102*c* would be gripped by a pair of tines 112 on the opposite edge (top edge in FIG. 5F) of the frame 114.

FIG. 5G shows the orientation of the gripper 110 and tines 112 for gripping and transporting a full tote 100 (which could have any number and type of sub-totes within the tote 100, including no sub-totes).

As shown in FIGS. 5A-G, the design of the universal gripper 110 allows gripping and transport of all sub-tote combinations using the same tines 112 and motors 116 on the frame 114. In applications where only sub-totes, or full totes are handled with the gripper, only those motors may be populated on the frame to minimize cost.

FIGS. 6-9 illustrate an example of the universal gripper 110 acquiring and transporting a sub-tote 102*a*. As shown, the sidewalls of sub-tote 102*a* include slots 120 provided in a horizontal flange in a top portion of the sidewalls. The bottom ends of tines 112 (opposite the ends affixed to the frame 114) have tapered ends in both width and thickness to promote reliable engagement in the tote/sub-tote slots 120.

Figure 6:
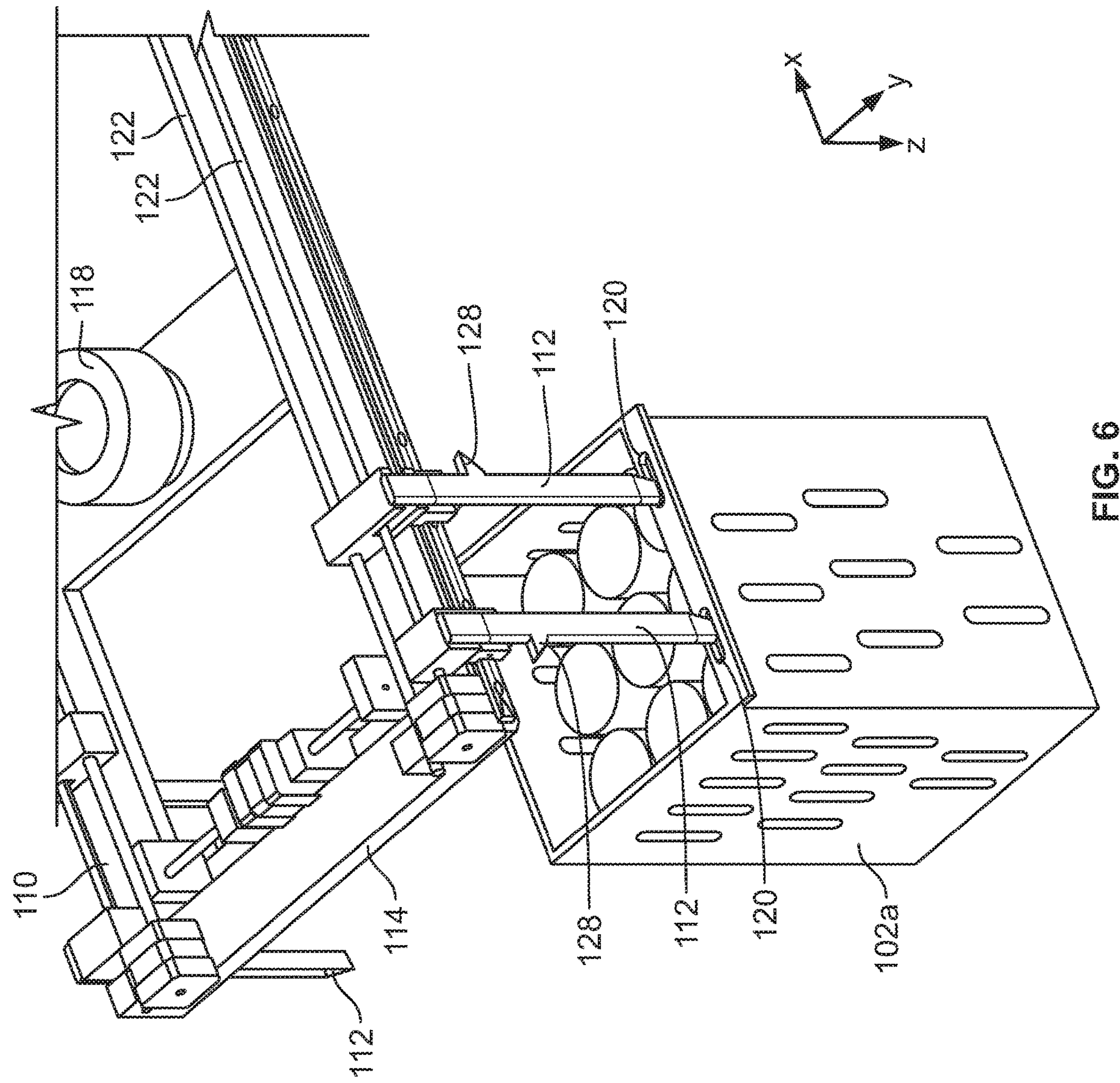
FIGS. 6-9 show views of a sub-tote engagement by the universal gripper.

As shown in FIG. 6, the motor 116 on one side of the gripper 110 moves the translating tines 112 along the x-axis so that the translating tines 112 on one side of the gripper 110 align with the slots 120 of the sub-tote 102*a*. The tines 112 may be aligned with the slots 120 based on the known spacing of the slots 120 on sub-tote 102*a* and the known position of the gripper 110 with respect to the sub-tote 102*a*. Alternatively or additionally, the gripper 110 may include optical sensors capable of aligning the translating tines with the slots 120.

Figure 7:
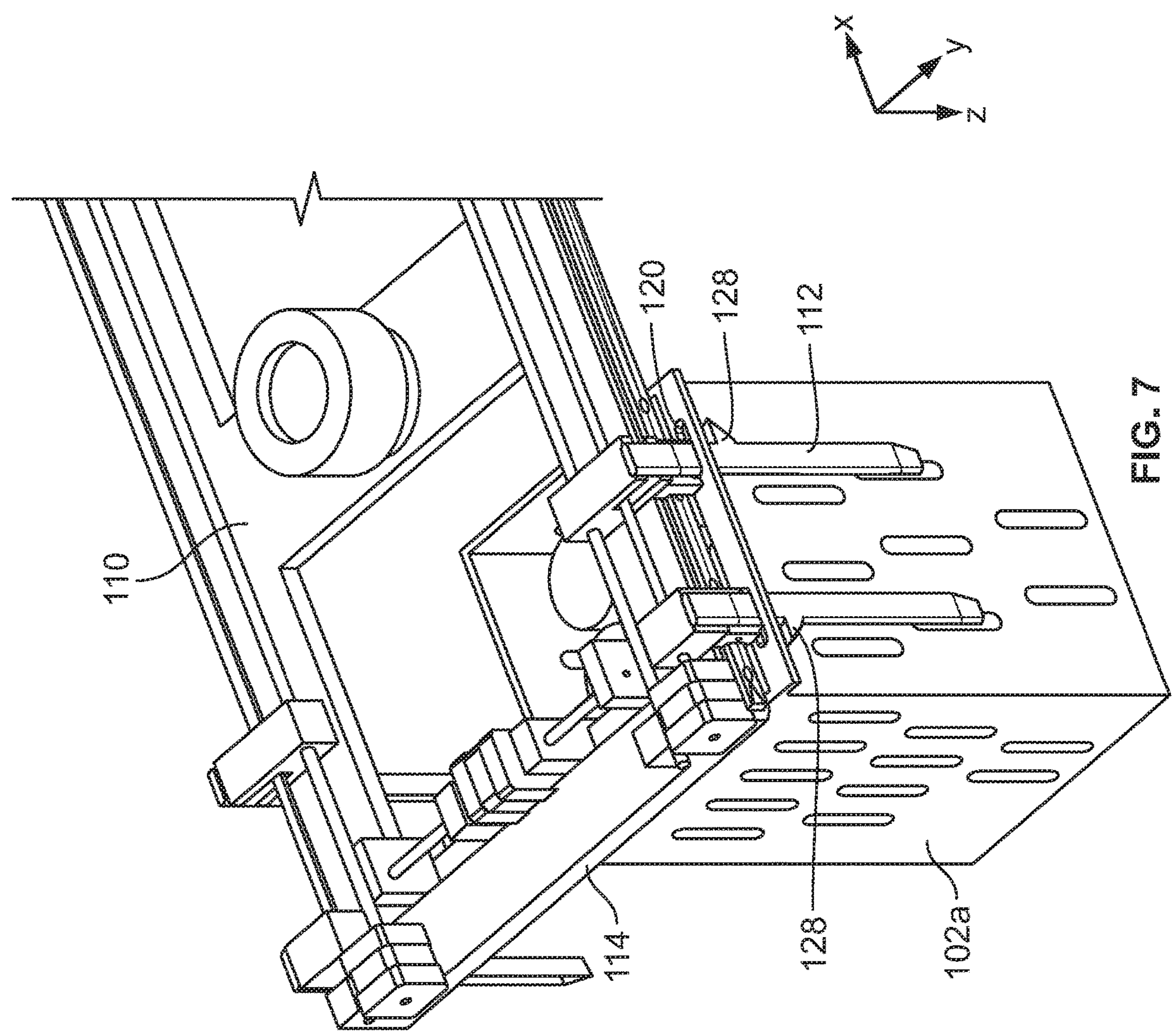

Once aligned with the slots 120, the tines 112 are lowered along the z-axis so that ends of the tines engage within the slots 120 as shown in FIG. 7. The entire gripper may move vertically along the z-axis to position the tines 112 within the slots 120. Alternatively, the tines may be mounted for vertical translation on the gripper 110 and lower relative to the frame 114 into the slots 120.

Figure 8:
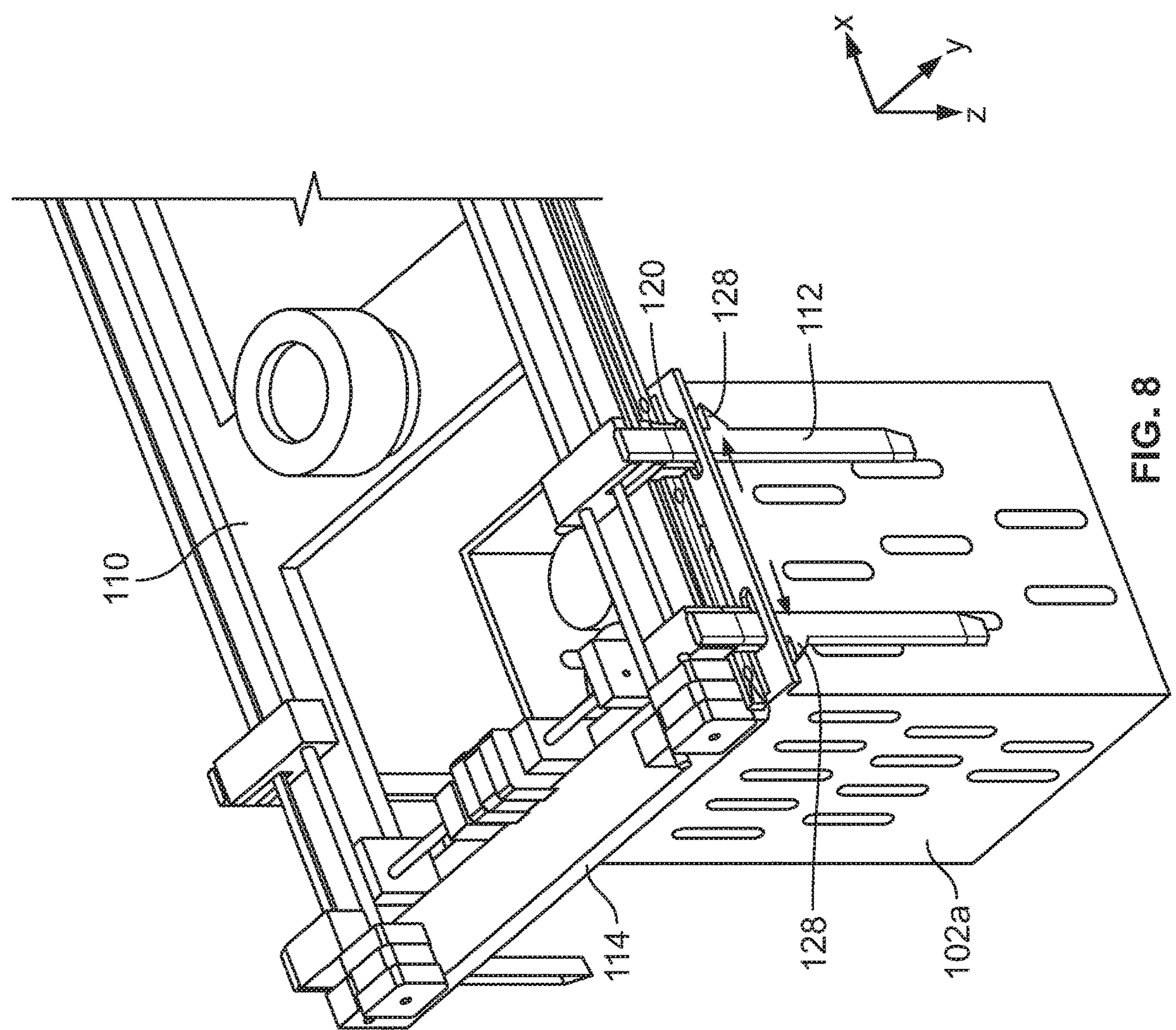
Figure 9:
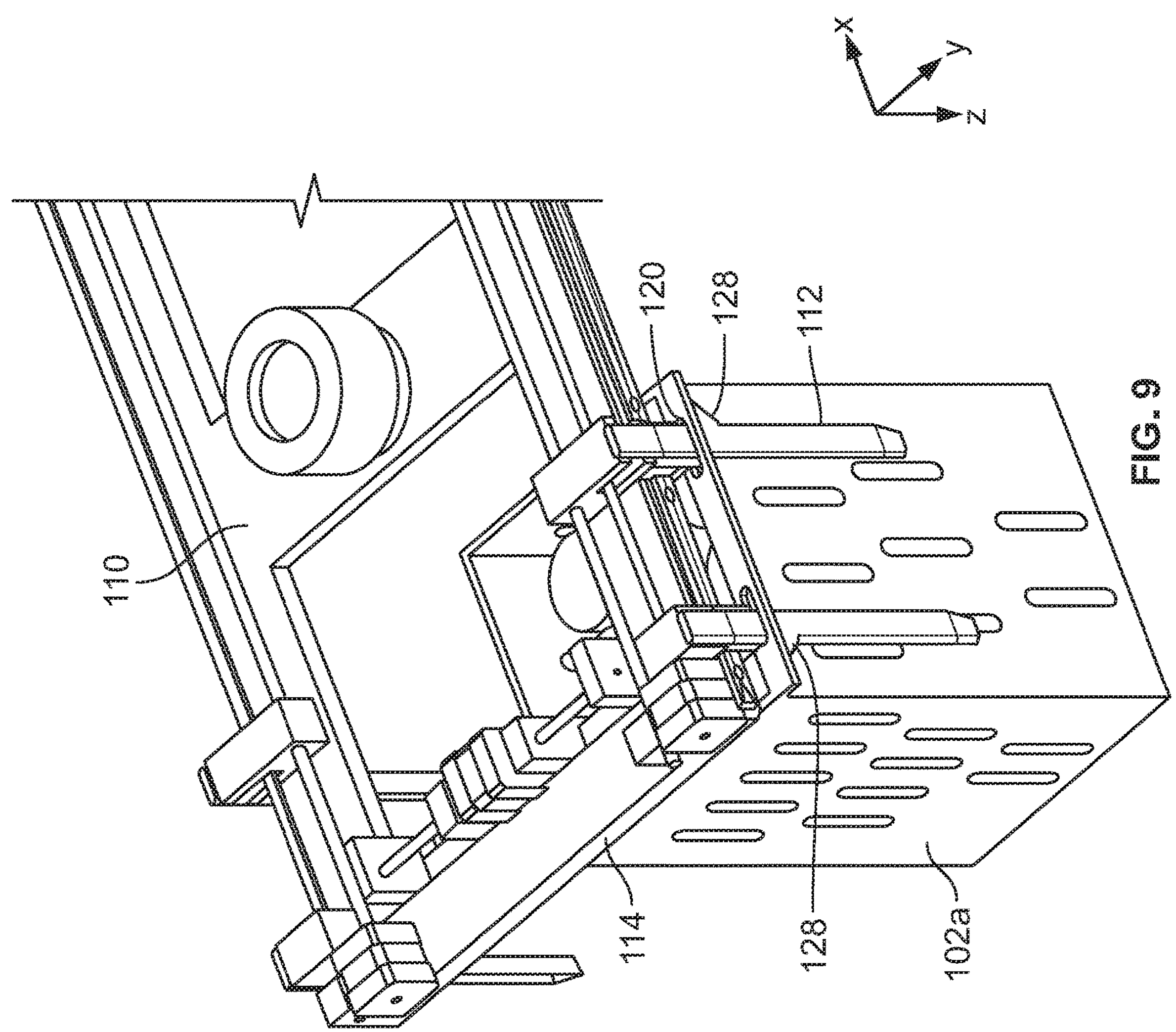

The tines 112 lower through the slots 120 until lifting tabs 128 on respective tines pass through the slots 120, as shown in FIG. 7. Thereafter, as shown in FIG. 8, the tines are moved away from each other along the x-axis so that the lifting tabs 128 extend underneath the top external flange of the sub-tote (in the direction of the arrows in FIG. 8). In this position, the lifting tabs 128 prevent removal of the tines 112 from the slots 120. The tines provide constraints against the sides of the sub-tote 102*a* that allow it to be lifted by the one side only (the tines prevent the sub-tote from rotating along the x-axis as viewed in the FIGS. 8 and 9). Thereafter, the universal gripper 110 may move the sub-tote 102*a* with the sub-tote 102*a* locked on the gripper. The lifting tabs 128 bear the lifting weight as the gripper 110 and sub-tote 102*a* are lifted. Supported on the lifting tabs 128, the weight of the sub-tote and its contents bias the sub-tote to rotate about the x-axis, against the tines 112, thus preventing wobbling of the sub-tote as it is transferred. To release the sub-tote 102*a*, the translating tines are moved toward each other until the lifting tabs 128 move clear of the top external flange. Thereafter, the tines 112 may be moved upward out of the slots 120.

It is understood that the other sub-totes 102*b* and 102*c* may be gripped and transported in the same manner as described above for sub-tote 102*a*. Tines 112 may engage within slots 120 on a single side of the sub-totes. Alternatively, where a sub-tote extends the full width of the tote along the y-axis (such as for example sub-tote 102*b*) the tines 112 may engage within slots 120 on opposed sides of the tote or sub-totes.

Figure 10:
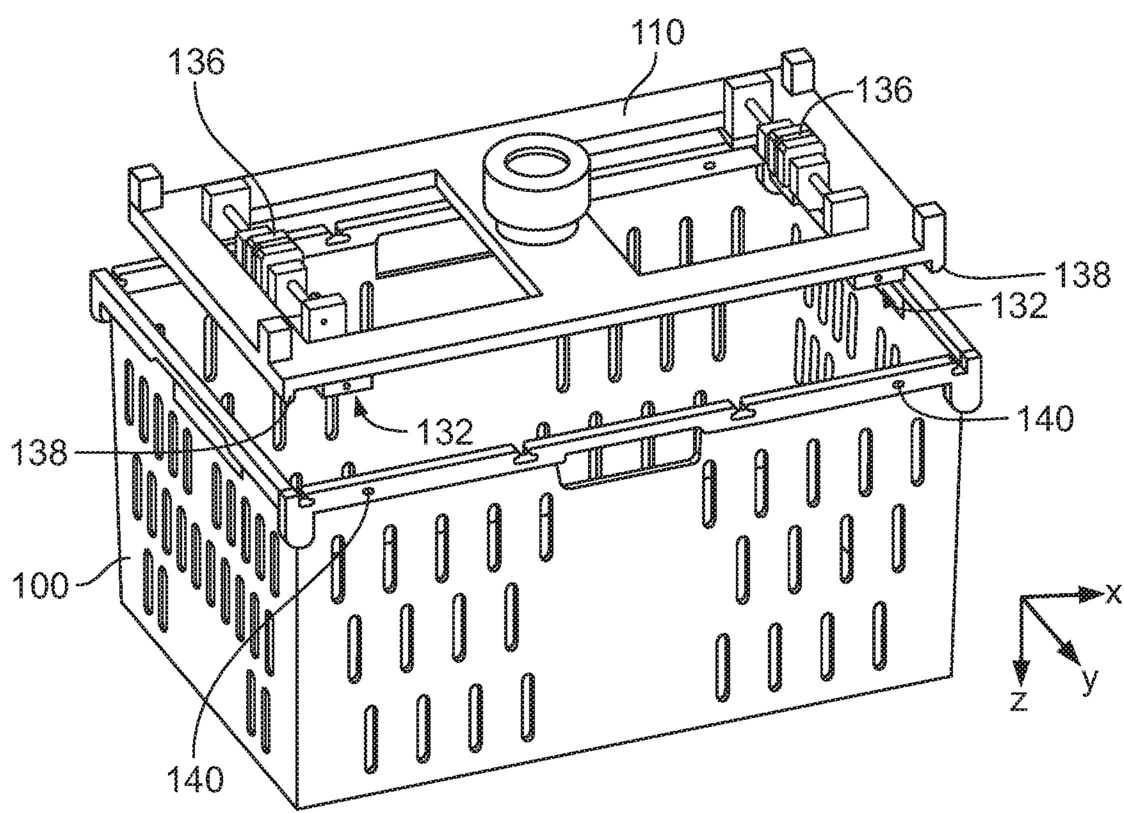
FIGS. 10-12 show full tote engagement by the universal gripper.
Figure 11:
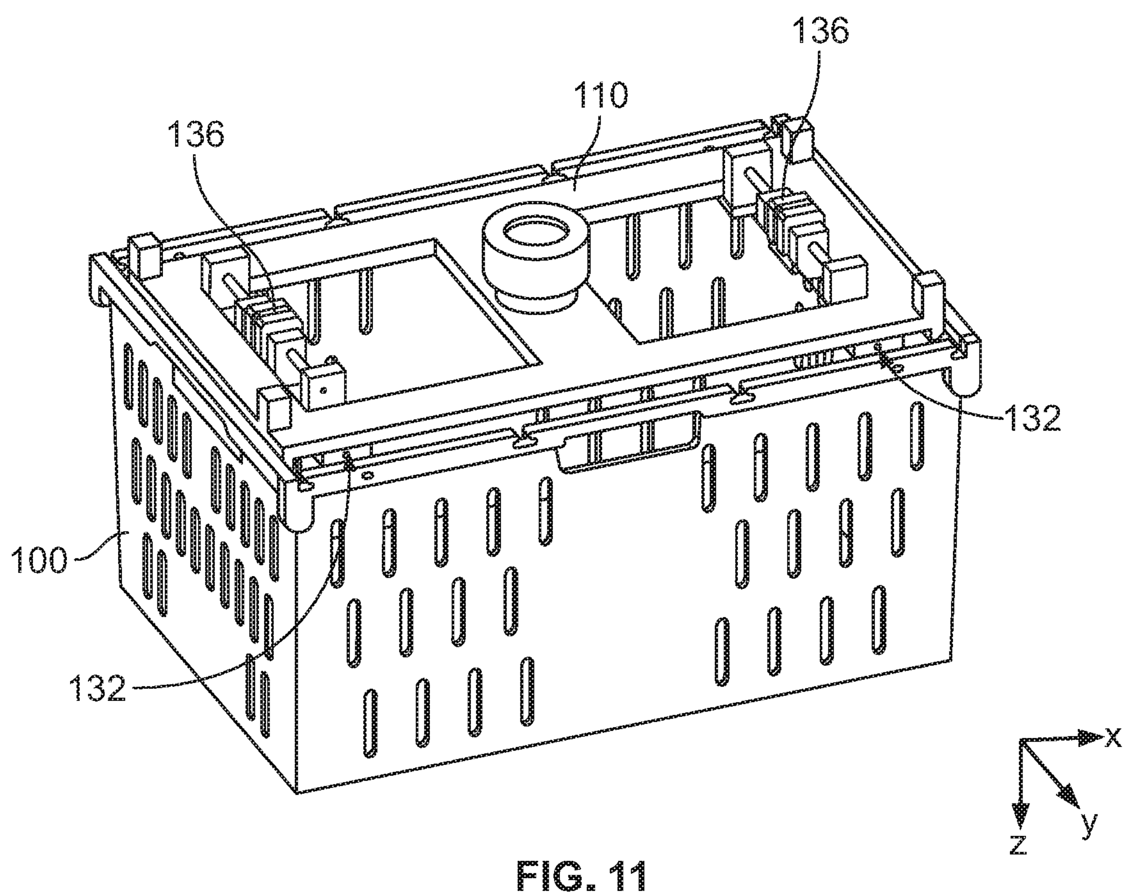
Figure 12:
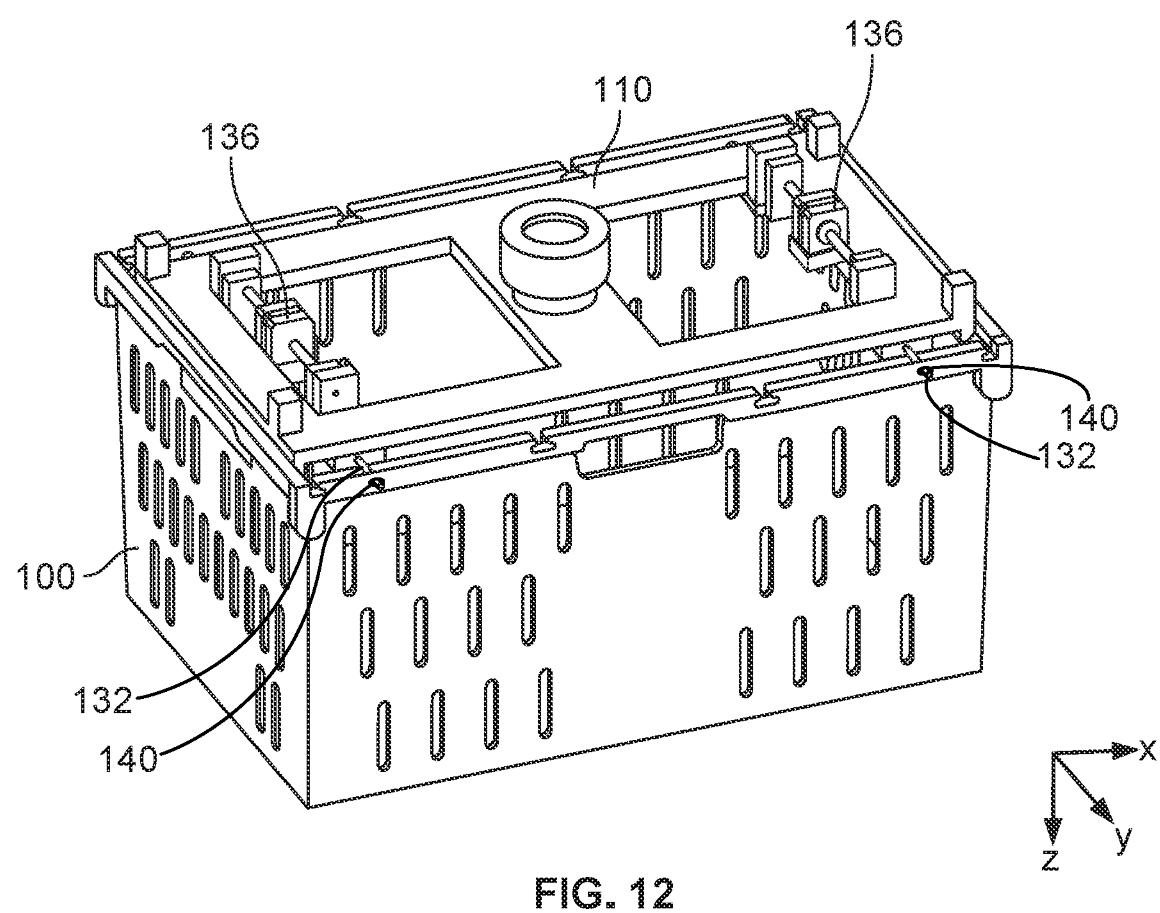

FIGS. 10-12 show engagement of the universal gripper 110 with a full tote 100. In this embodiment, the vertically extending tines 112 may be omitted from the gripper 110. The gripper 110 may instead include projecting pieces in the form of horizontally extending pins 132 (seen partially in FIG. 12; recessed within the frame 114 in FIGS. 10 and 11), two on each of the long sides of the gripper 110. The horizontal pins 132 are capable of extending along the y-axis by motors 136 mounted on the frame 114. Each pair of pins 132 on opposed sides of frame 114 may be driven by a single motor 136.

FIG. 11 shows the gripper 110 fully inserted into the full tote 100, with the horizontal pins 132 still retracted within the frame 114. Chamfered lead-ins 138 (FIG. 10) are provided on the ends of the frame 114, orthogonal to the horizontal pins 132 to promote reliable positioning. FIG. 12 shows the horizontal pins 132 extended outward and into slots 140 in the top perimeter rim of the tote 100. There may be two slots 140 on each long side of the tote 100 in this configuration. The pins 132 may have bulleted ends to promote reliable engagement into the tote rim. The pins 132 may further have shoulders that abut just inside the rim to prevent the tote from shifting on the tines during lifting or manipulation of the tote.

FIGS. 10-12 show a pair of pins 132 engaging within a pair of slots 140 on one side of the tote 100. A second pair of pins 132 may engage within a second pair of slots 140 on the opposed side of tote 100 as well to provide four engagement points of gripper 110 with the tote 100. With the pins 132 secured within slots 140, the gripper 110 may lift and transport the tote 100. To release the tote 100, the motors 136 may retract the horizontal pins 132 from the slots 140.

FIGS. 13 to 25 illustrate a universal gripper 110 mounted to a Cartesian robot 150. The robot 150 is driven along a pair of rails 152 by a pair of motors 154 (FIG. 15) on the robot 150. For example, each rail 152 may include toothed timing belt drives, driven by one through-shaft servo motor 154. The through shaft is attached to the two parallel drives to ensure the two sides are driven uniformly.

Figure 13:
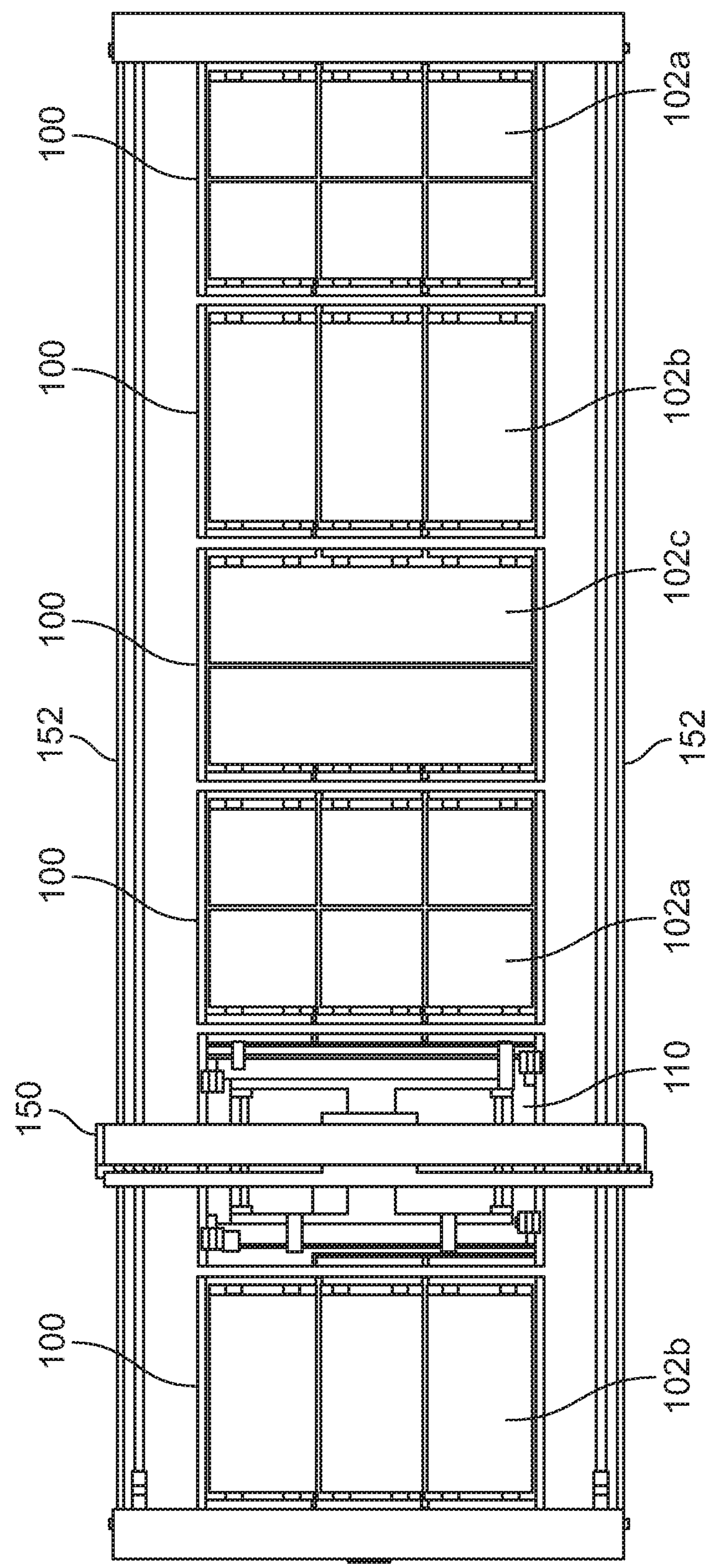
FIG. 13 is a top view of the universal gripper mounted on Cartesian robot.
Figure 14:
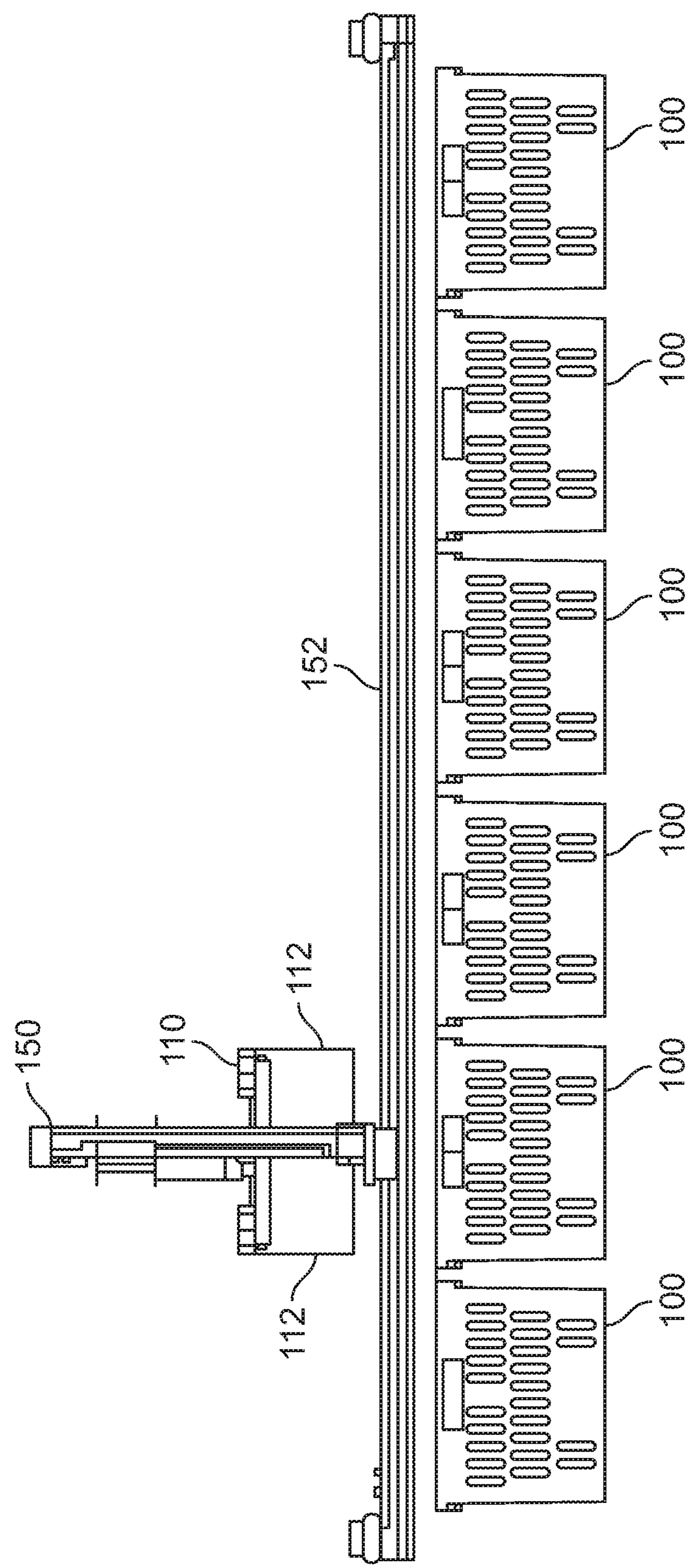
FIG. 14 is a front view of the universal gripper mounted on Cartesian robot.

The robot 150 further includes a shaft 158 which affixes within hub 118 of the gripper 110 to translate and/or rotate the gripper 110. FIG. 13 is a top view of the robot 150 and gripper 110 over a number of totes 100. FIG. 14 is a side view of the robot 150 and gripper 110 over a number of totes 100. And FIGS. 15-25 are perspective views of the robot 150 and gripper 110 transferring a sub-tote 102 from one tote to another tote. The Cartesian robot and gripper may be mounted within the storage racking to enable in-storage transfers of sub-totes between the full totes. This is used to defragment the storage; i.e. combine empty sub-totes together in full totes, and thereby increase storage density within the system.

Figure 15:
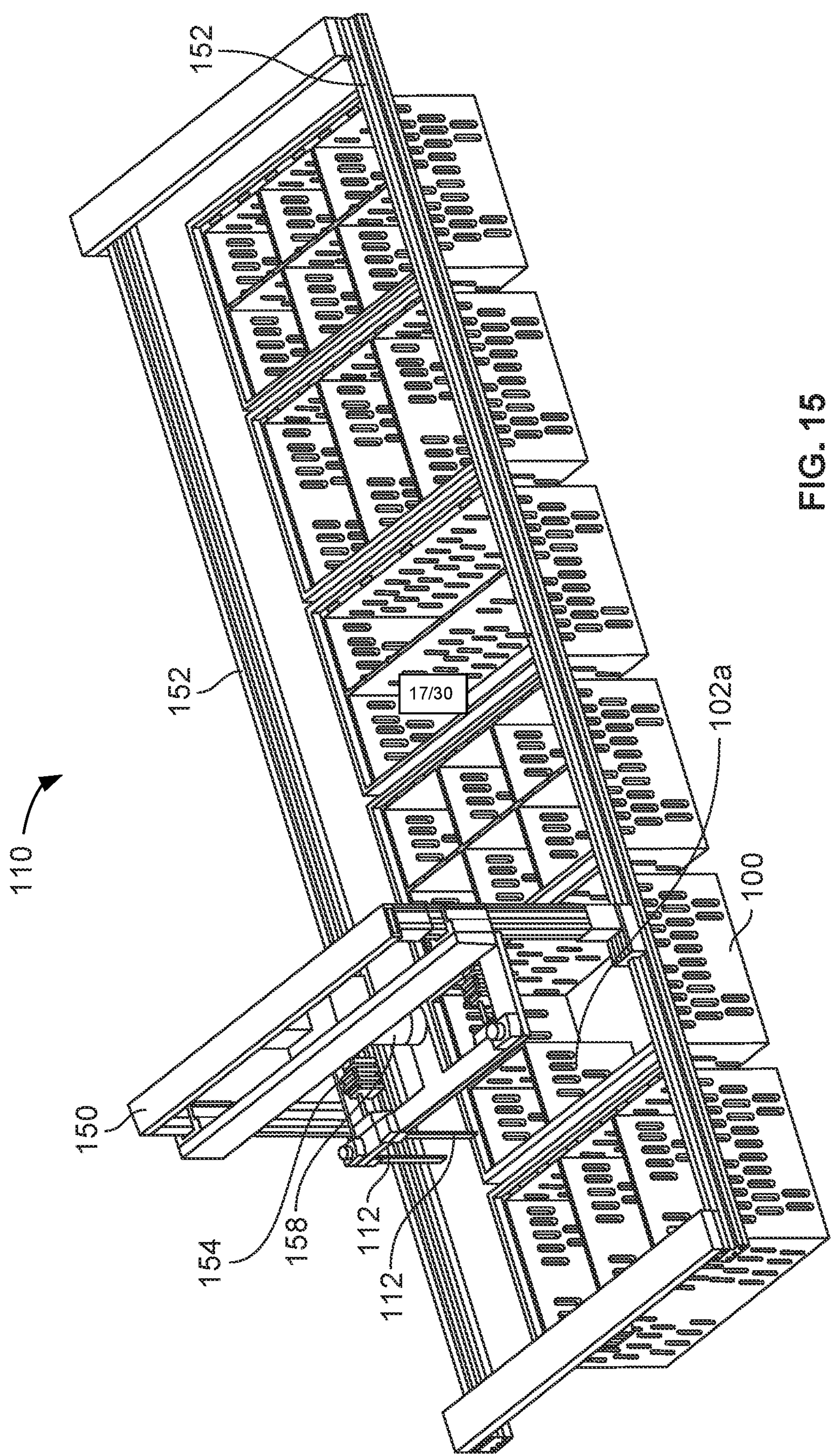
FIGS. 15-25 illustrate transfer of a sub-tote between full totes using a Cartesian robot.
Figure 16:
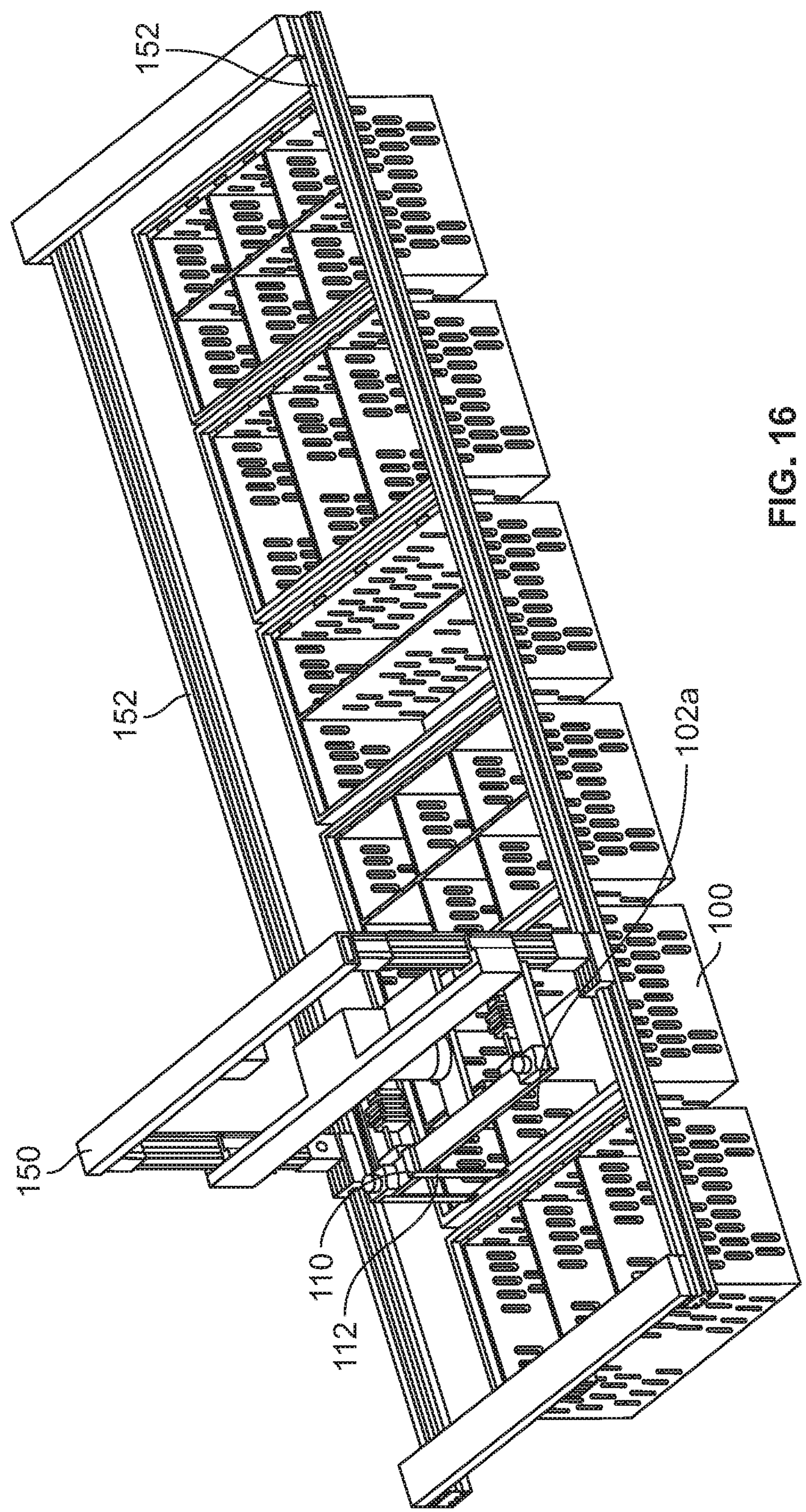
Figure 17:
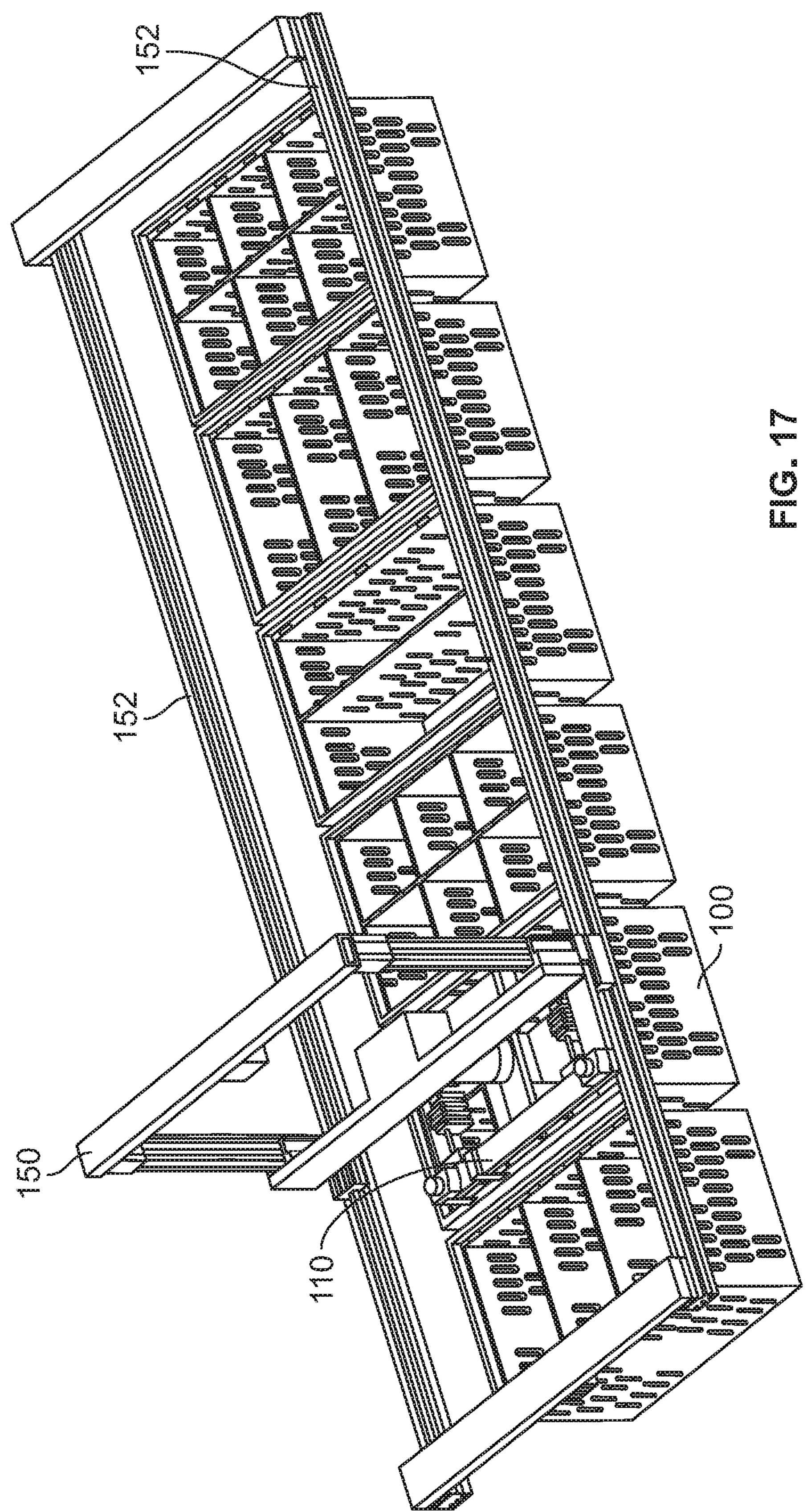

FIG. 15 shows the gripper 110 in a fully raised position. Depending on tine length, gripper does not need to be raised to full height position when not carrying a sub-tote. FIG. 16 shows the gripper 110 lowering its tines into slots in top exterior flange of a one-sixth sub-tote 102*a*. FIG. 17 shows the first pair of gripper tines 112 fully inserted into sub-tote slots, with the tines in sub-tote driven apart to position lifting tabs underneath the slots.

The figures (for example FIGS. 6-9) show a one-sixth sub-tote 102*a* being transferred by a pair of gripper tines 112 on a first side of universal gripper 110. It may happen that there is a second sub-tote 102*a* positioned opposite the first sub-tote 102*a*. The second pair of gripper tines 112 on the opposite side of universal gripper 110 would penetrate through the slots in the top exterior flanges of this opposite side sub-tote 102*a*. However, the second pair of tines 112 are not driven apart thereby allowing the second pair of tines 112 to be lifted without lifting the opposite side sub-tote 102*a*. If the one-sixth, or one-half sub-totes on opposite sides of the full tote are desired to be lifted together, then all tines are driven apart to position the lifting tabs underneath the top exterior flanges of both sub-totes.

Figure 18:
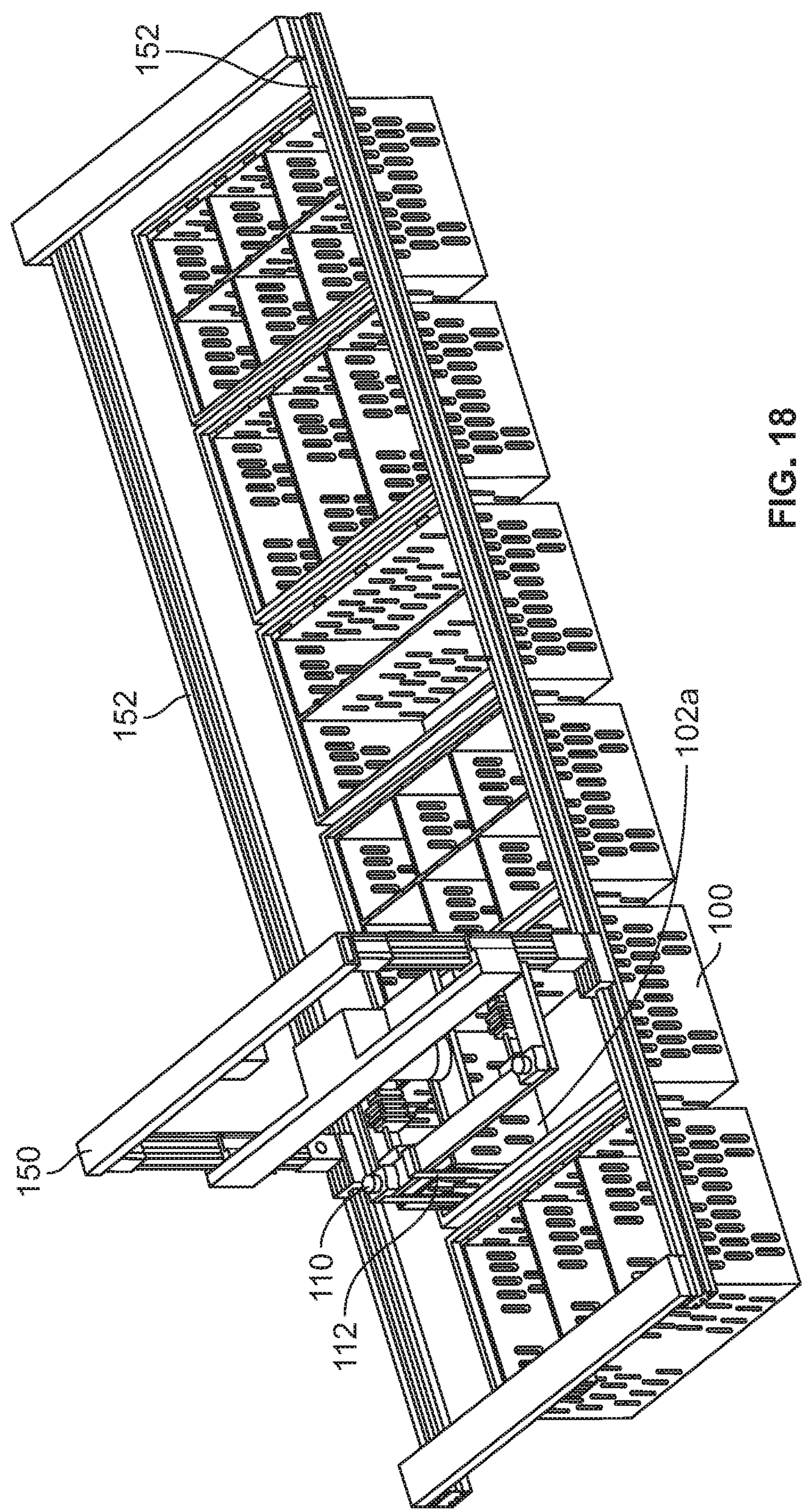
Figure 19:
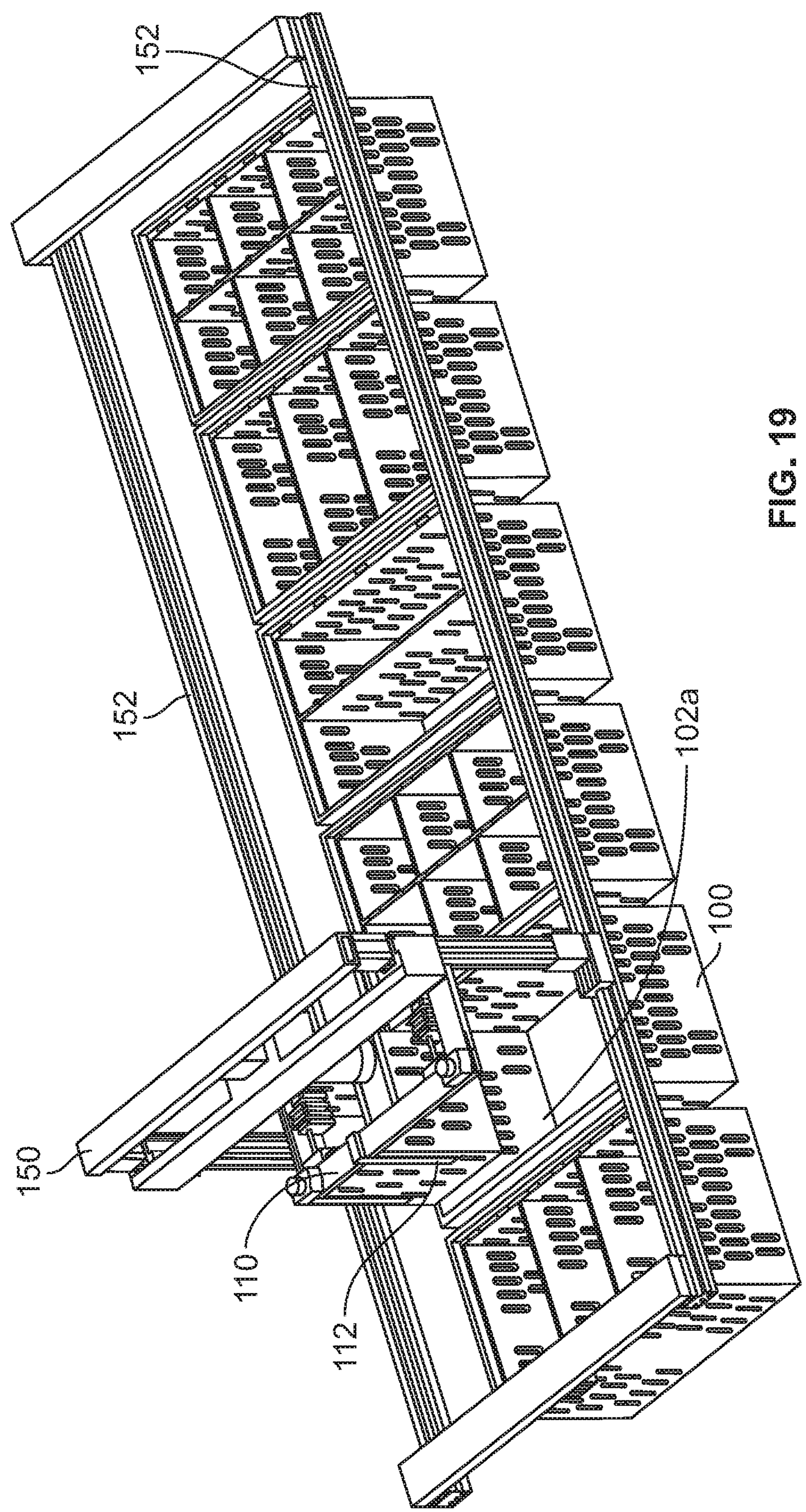
Figure 20:
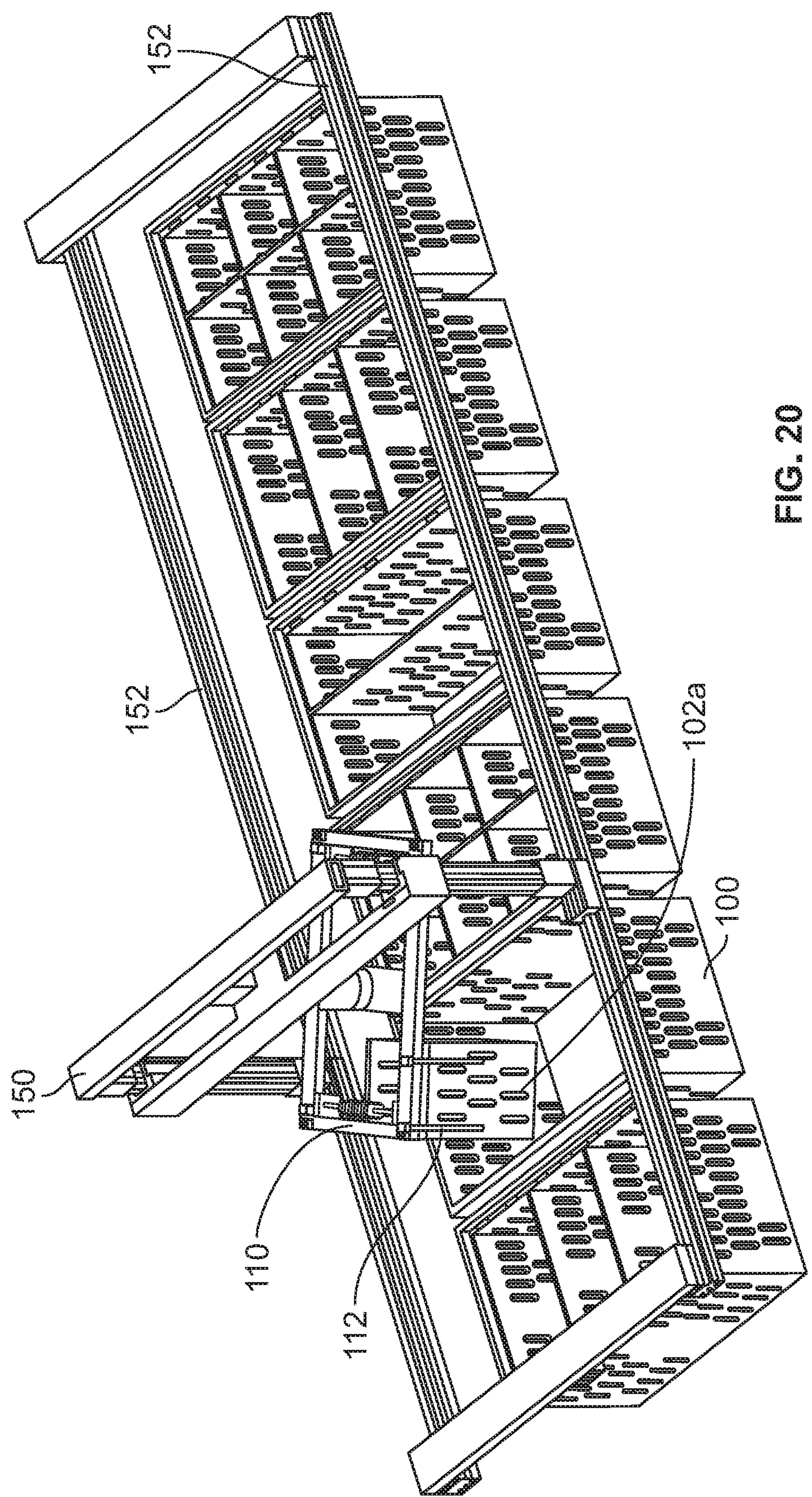
Figure 21:
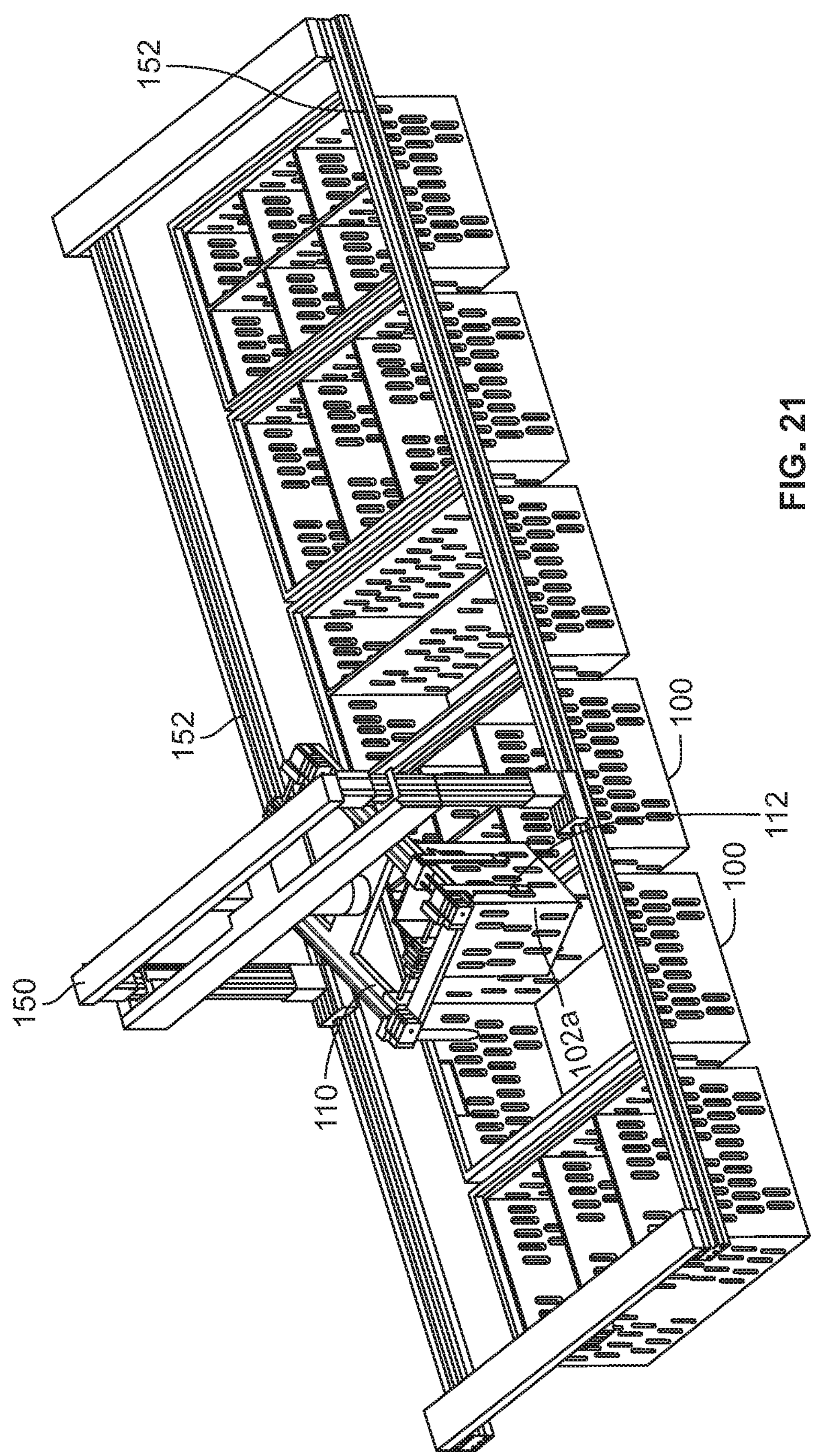

FIG. 18 shows the sub-tote 102*a* in the half-lifted position out of the source tote 100, supported on the first pair of tines 112. FIG. 19 shows the sub-tote 102*a* fully lifted out of the source tote 100. FIG. 20 shows the Cartesian robot 150 translating and rotating the gripper 110 and sub-tote 102*a* simultaneously. Rotation of the sub-tote 102*a* is needed in this example, as the sub-tote 102*a* is being placed in the opposite side of the destination tote, as compared to the source tote. FIG. 21 shows continued rotation and translation of the sub-tote 102*a* on the gripper 110 and robot 150. If the sub-tote 102*a* was to be positioned in the middle of the other side, or opposite corner of the source corner location, the tines would also be translated within the gripper 110 during the movement of the gripper.

Figure 22:
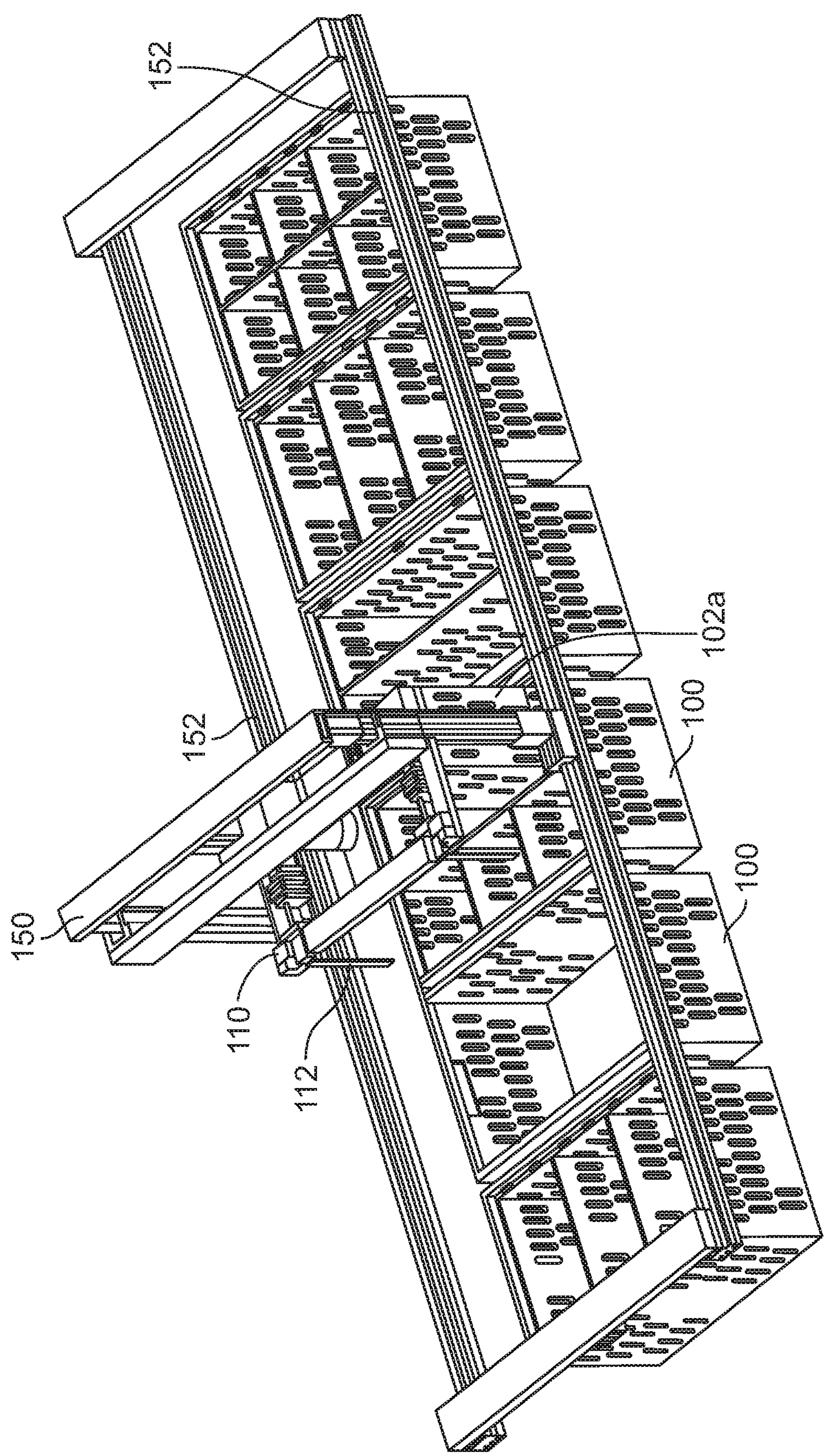
Figure 23:
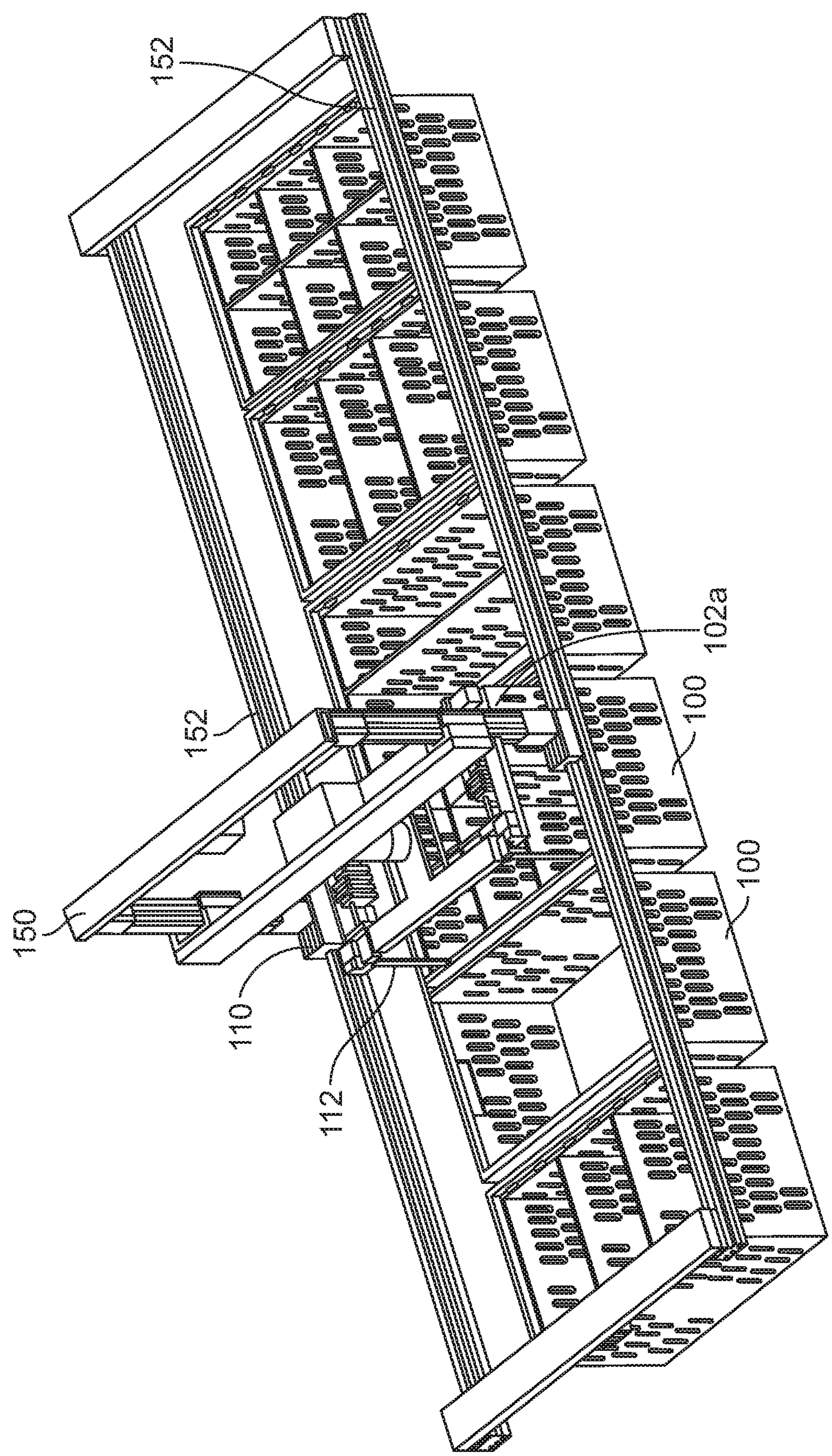
Figure 24:
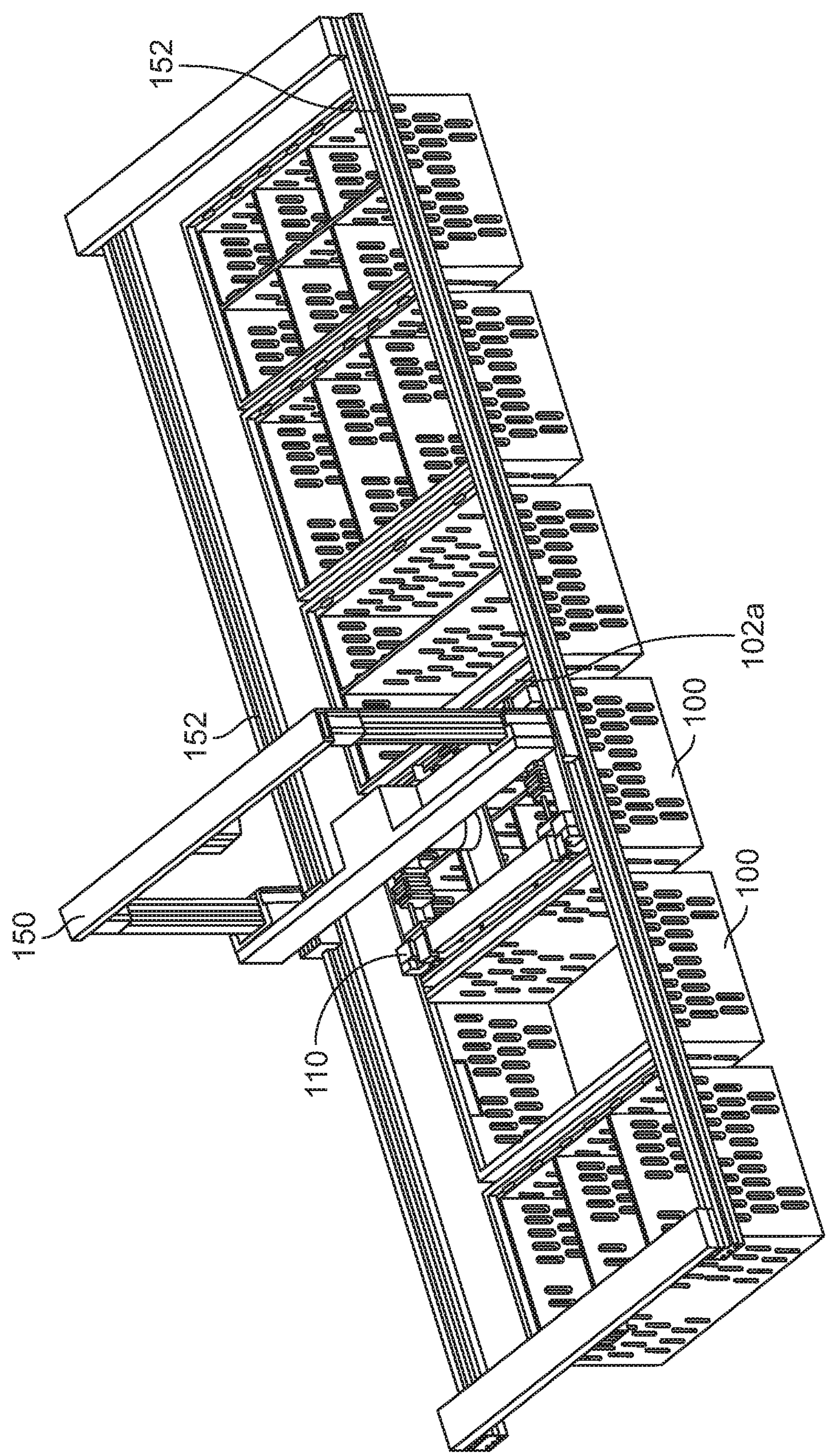
Figure 25:
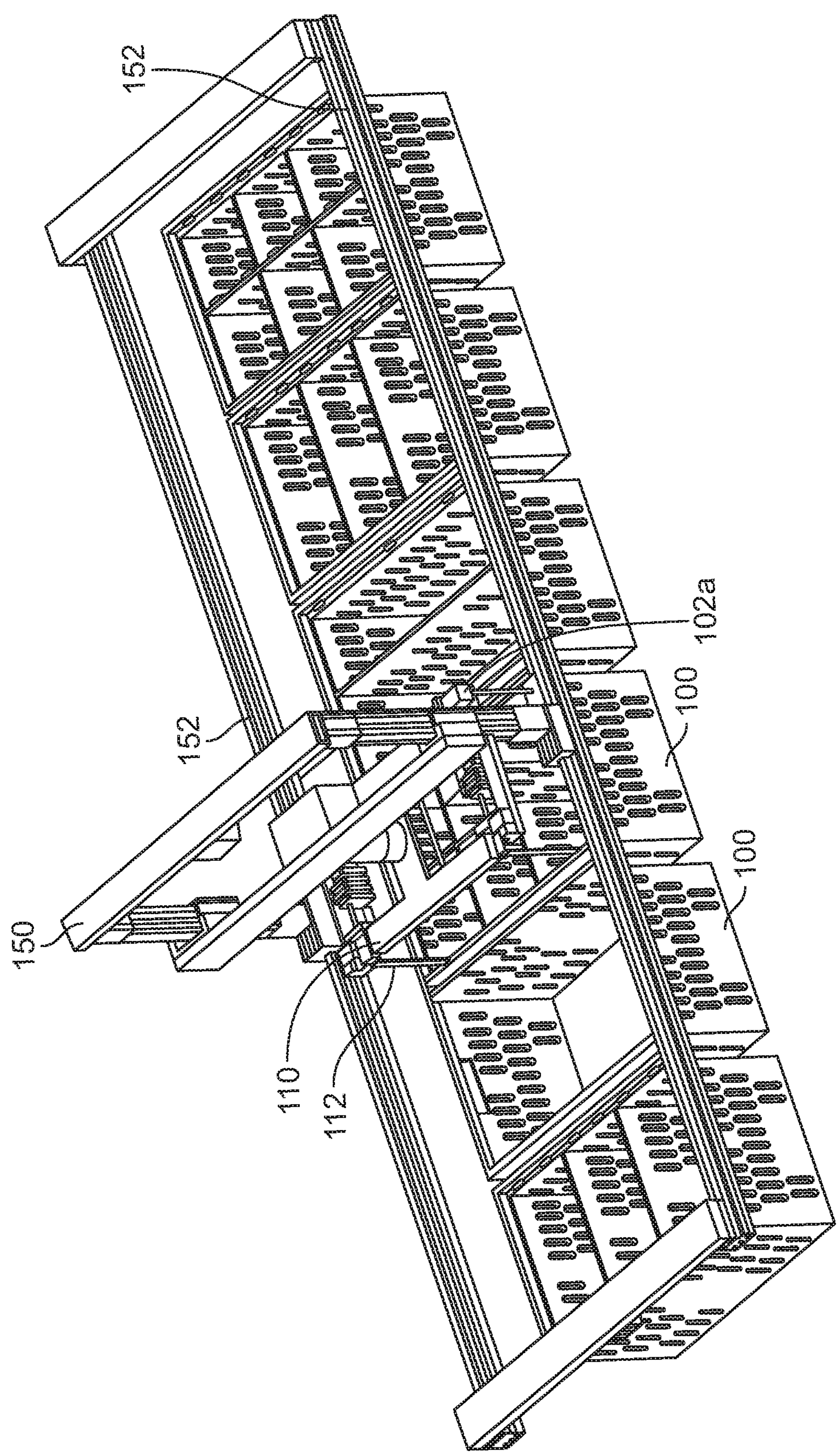

FIG. 22 shows the Cartesian robot 150 having translated and rotated the sub-tote 102*a* over its destination position. FIG. 23 shows the Cartesian robot 150 having partially lowered the gripper 110 and sub-tote 102*a* into the destination location. FIG. 24 shows the Cartesian robot 150 having fully lowered the gripper 110 and sub-tote 102*a* into the destination location. Once in this position, the tines 112 are moved toward each other to disengage the lifting tabs 128 (FIG. 8) from underneath the top external flange of the sub-tote 102*a*. The tines 112 on the opposite side of the gripper 110 are positioned to allow them to extend into the slots 120 of other sub-totes 102*a* already contained within the destination full tote 100. As an alternative, the gripper 110 could be lengthened to permit the tines 112 not lifting or lowering sub-totes 102*a* to straddle the outside of the full tote 100. FIG. 25 shows the gripper 110 and robot 150 after releasing the sub-tote 102*a* in its destination position. The gripper 110 with its tines 112 are lifted out of the slot 120 of the sub-tote 102*a*.

Figure 26:
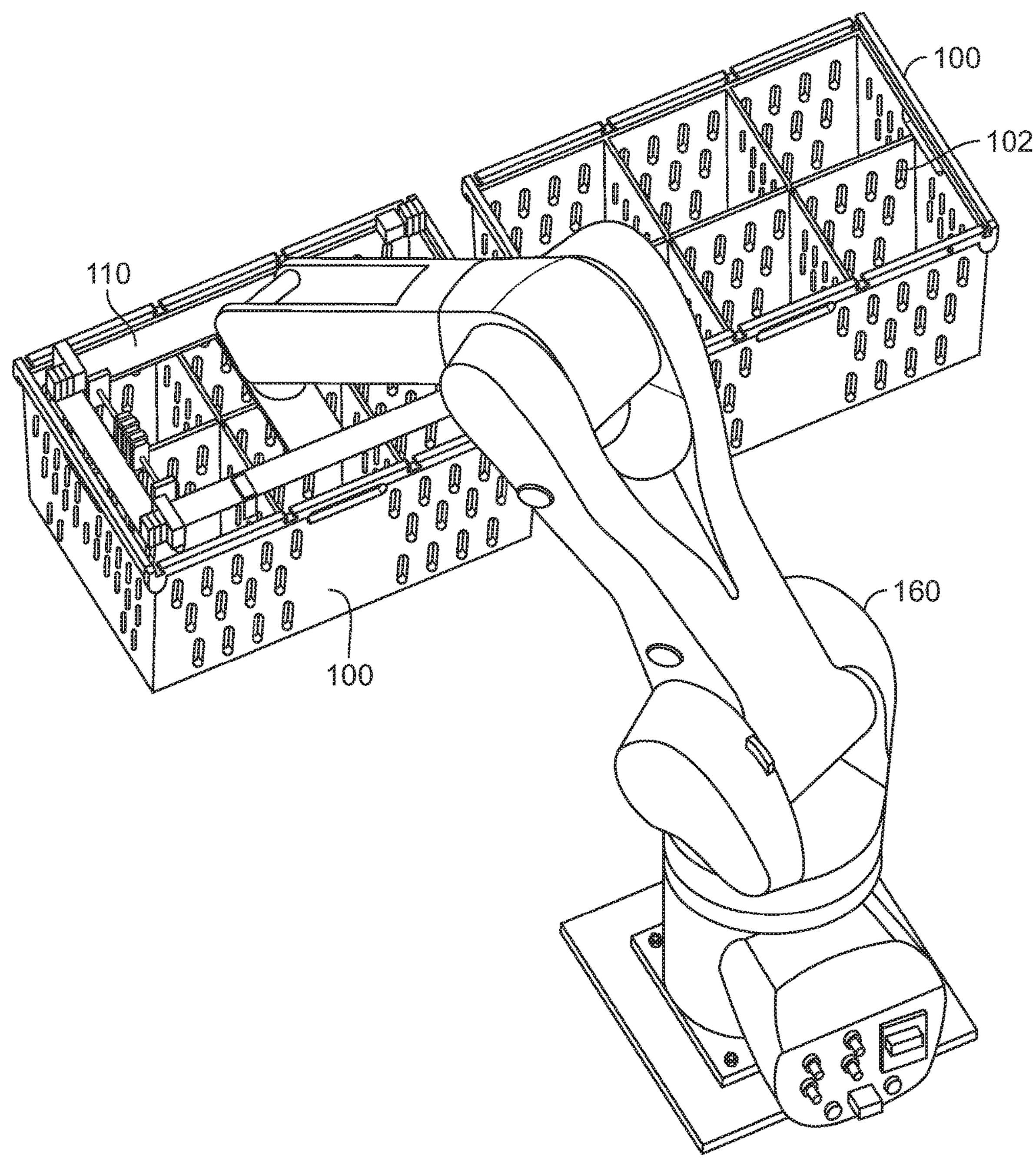
FIG. 26 shows a universal gripper mounted to six-axis robot.

FIG. 26 shows an alternative embodiment where the universal gripper 110 is mounted to a six-axis robot 160, which can be used to transport full totes 100 and/or sub-totes 102. This configuration may be used in distribution centers and workstations where full totes containing sub-totes are presented together.

Figure 27:
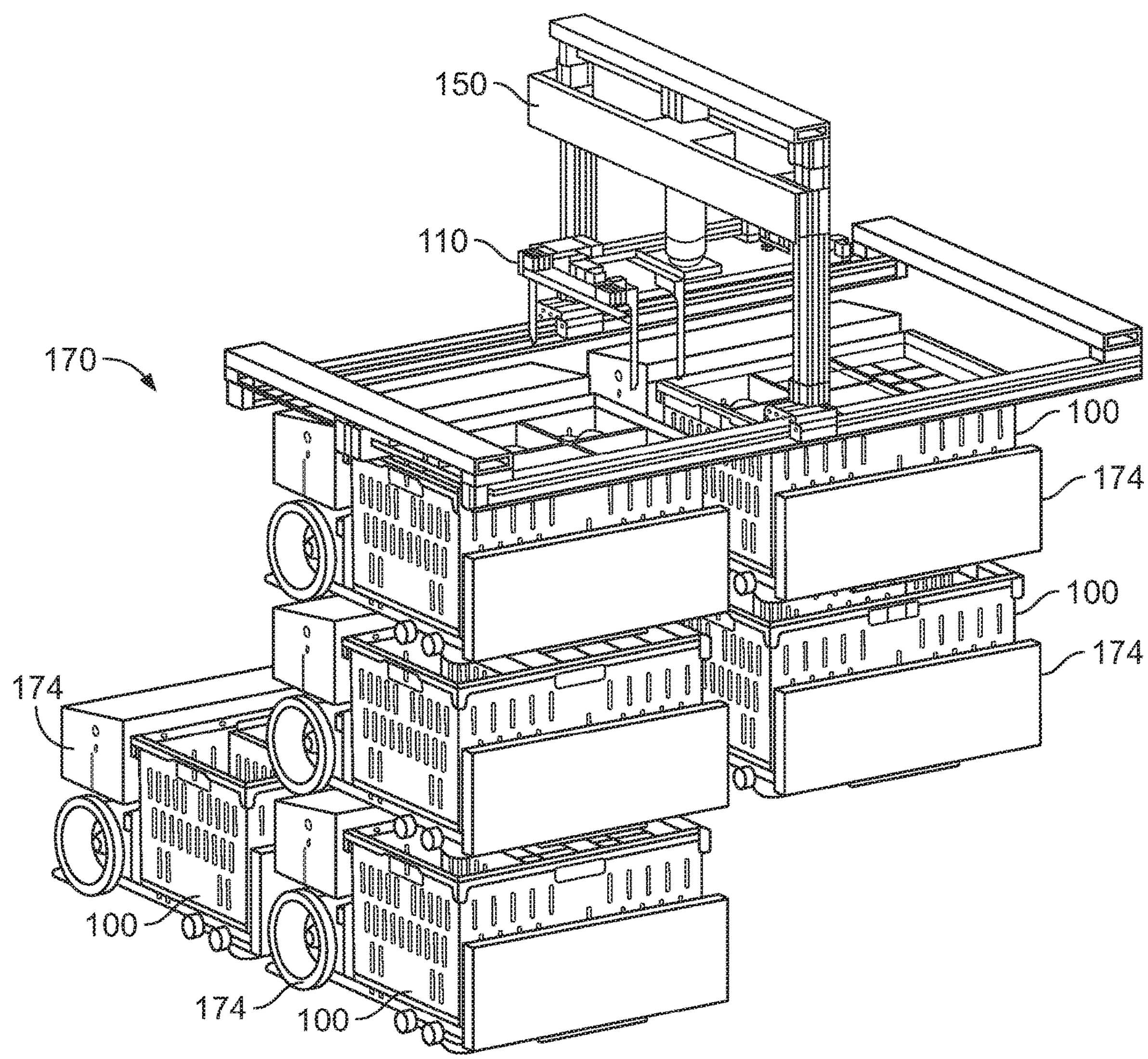
FIGS. 27 and 28 show a universal gripper operating within a workstation for transferring sub-totes between totes.
Figure 28:
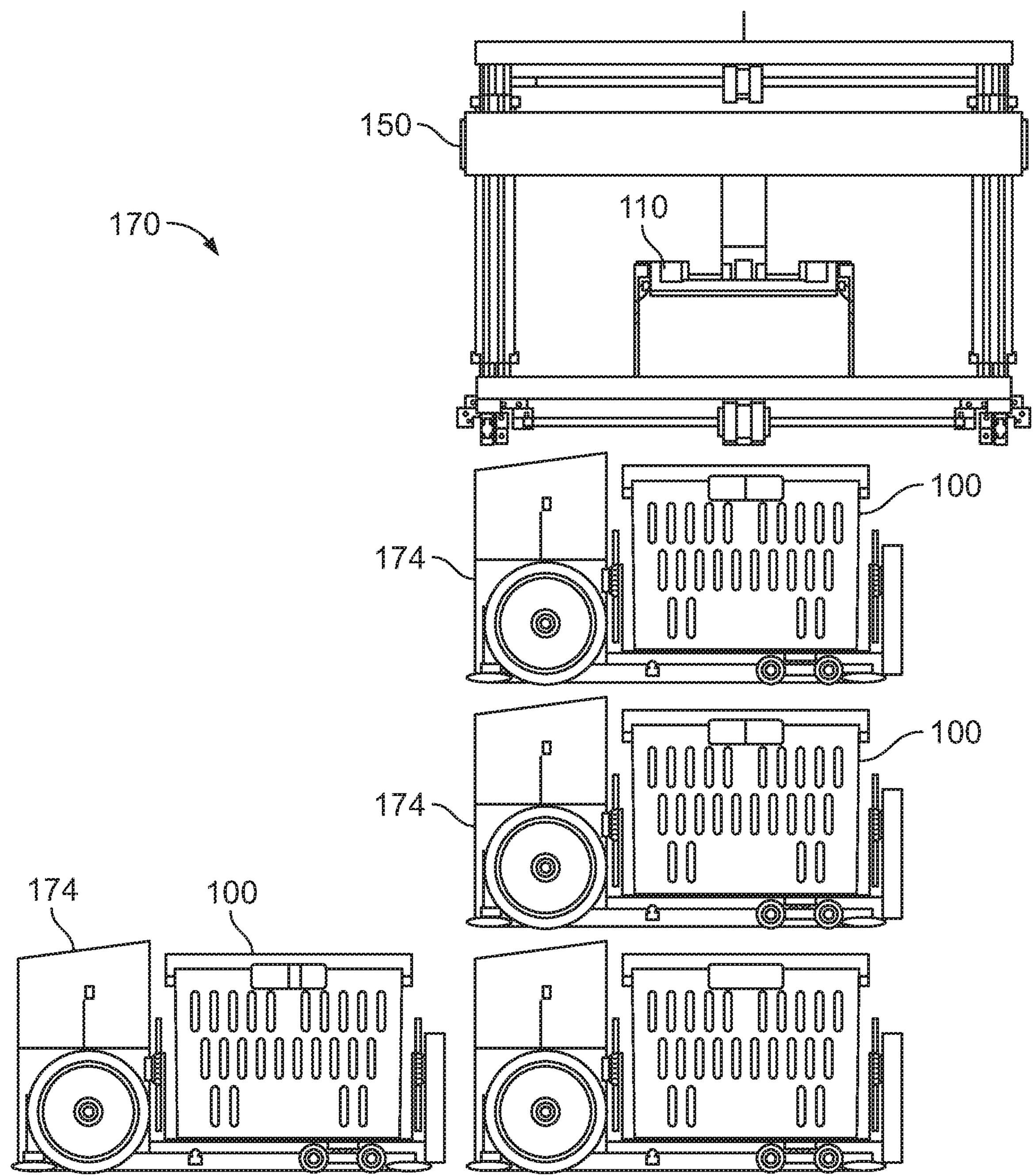

FIGS. 27 and 28 are perspective and side views of a universal gripper 110 mounted above dynamic workstation 170. Mobile robots 174 climb through a workstation 170 and present totes 100 with sub-totes 102 to the Cartesian robot 150 with a universal gripper 110. This can be used for defragmenting empty sub-totes within the system, or transferring sub-totes into totes for store replenishment. An example of a dynamic workstation 170 is shown for example in U.S. patent application Ser. No. 15/591,956, entitled, "Order Fulfillment System," filed May 10, 2017, and U.S. patent application Ser. No. 15/956,346, entitled, "Picking Workstation with Mobile Robots & Machine Vision Verification of Each Transfers Performed by Human Operators," filed Apr. 18, 2018, which applications are incorporated herein by reference in their entirety. For example, U.S. patent application Ser. No. 15/591,956 discloses a dual gantry system supporting a Cartesian robot that can support the universal gripper 110.

The foregoing detailed description has been presented for purposes of illustration and description. It is not intended to be exhaustive or to limit the description to the precise form disclosed. Many modifications and variations are possible in light of the above teaching. The described embodiments were chosen in order to best explain the principles of the claimed system and its practical application to thereby enable others skilled in the art to best utilize the claimed system in various embodiments and with various modifications as are suited to the particular use contemplated. It is intended that the scope of the method be defined by the claims appended hereto.

We claim:

1. A system for transferring totes and/or sub-totes comprising goods, the system comprising:
- a workstation configured to receive a plurality of mobile robots having the totes and/or sub-totes;
- one or more rails; and
- a universal gripper supported for linear movement along the one or more rails, the universal gripper configured to transport at least one of a tote and a sub-tote, the universal gripper comprising:
  - a frame comprising sides parallel to the one or more rails;
  - a pair of projecting pieces, at least one of which is translationally mounted along one side of the frame;
  - a drive mechanism configured to position the pair of projecting pieces so as to align with a pair of slots on one of the tote and sub-tote;
  - wherein engagement of the pair of projecting pieces within the tote or sub-tote supports the tote or sub-tote on the gripper for transport.

2. The system of claim 1, wherein the workstation is configured to receive mobile robots at a first level, and then present the totes and/or sub-totes within the mobile robots to the universal gripper at a second level above the first level.

3. The system of claim 1, wherein the system transfers sub-totes, and wherein the sub-totes are defragmented at the workstation by emptying goods from one sub-tote at the workstation to another sub-tote at the workstation.

4. The system of claim 1, wherein inventory within sub-totes is replenished into totes at the workstation.

5. The system of claim 1, further comprising a Cartesian robot, wherein the universal gripper mounted to the Cartesian robot, the Cartesian robot translating and rotating the universal gripper.

6. The system of claim 1, wherein the system transfers sub-totes, and wherein the projecting pieces comprise tines that are oriented orthogonally to the frame and configured to move orthogonally with respect to the frame to engage within slots of the sub-tote.

7. The system of claim 6, wherein the tines support the sub-tote on a single side of the sub-tote.

8. The system of claim 6, further comprising a lifting tab on each of the tines in the pair of tines, the lifting tabs configured to lock a sub-tote onto the universal gripper.

9. The system of claim 6, wherein the tines are mounted on a single side of the frame and are configured to move toward and away from each other along the side of the frame.

10. The system of claim 9, wherein the tines are configured to operate with different sized sub-totes by moving toward or away from each other along the side of the frame.

11. The system of claim 1, wherein the projecting pieces comprise pins that are oriented parallel to the frame and are configured to move in a plane parallel to the frame to engage within slots of the tote.

12. A system for transferring totes and/or sub-totes comprising goods, the system comprising:
- one or more rails; and
- a universal gripper supported for linear movement along the one or more rails, the universal gripper configured to transport at least one of a tote and a sub-tote, the universal gripper comprising:
  - a frame comprising sides parallel to the one or more rails;
  - a pair of projecting pieces, at least one of which is translationally mounted along one side of the frame;
  - a drive mechanism configured to position the pair of projecting pieces so as to align with a pair of slots on one of the tote and sub-tote;
  - wherein engagement of the pair of projecting pieces within the tote or sub-tote supports the tote or sub-tote on the gripper for transport; and
- a workstation configured to receive a plurality of mobile robots having the totes and/or sub-totes at a first location, and present the totes and/or sub-totes to the universal gripper at a second location different than the first location, the universal gripper transferring at least one of a tote and a sub-tote to or from the mobile robot at the second location.

13. The system of claim 12, wherein the first location is at a first level and the second location as at a second level higher than the first level.

14. The system of claim 12, wherein the system transfers sub-totes, and wherein the sub-totes are defragmented at the workstation by emptying goods from one sub-tote at the workstation to another sub-tote at the workstation.

15. The system of claim 12, wherein inventory within sub-totes is replenished into totes at the workstation.

16. The system of claim 12, further comprising a Cartesian robot, wherein the universal gripper mounted to the Cartesian robot, the Cartesian robot translating and rotating the universal gripper.

17. The system of claim 12, wherein the system transfers sub-totes, and wherein the projecting pieces comprise tines that are oriented orthogonally to the frame and are configured to move orthogonally with respect to the frame to engage within slots of the sub-tote.

18. The system of claim 17, wherein the tines support the sub-tote on a single side of the sub-tote.

19. A system for transferring totes and/or sub-totes comprising goods, the system comprising:
- one or more rails; and
- a universal gripper supported for linear movement along the one or more rails, the universal gripper configured to transport at least one of a tote and a sub-tote, the universal gripper comprising:
  - a frame comprising sides parallel to the one or more rails;
  - a pair of projecting pieces, at least one of which is translationally mounted along one side of the frame;
  - a drive mechanism configured to position the pair of projecting pieces so as to align with a pair of slots on one of the tote and sub-tote;
  - wherein engagement of the pair of projecting pieces within the tote or sub-tote supports the tote or sub-tote on the gripper for transport; and
- a workstation configured to receive a plurality of mobile robots having the totes and/or sub-totes at a first location, the universal gripper engaging and removing a sub-tote from a first mobile robot, moving along the one or more rails, and depositing the sub-tote into a second mobile robot.

20. The system of claim 19, wherein transfer of the sub-tote replenishes inventory into the system.

* * * * *

UNITED STATES PATENT AND TRADEMARK OFFICE

CERTIFICATE OF CORRECTION

PATENT NO. : 11,724,877 B2
APPLICATION NO. : 17/081836
DATED : August 15, 2023
INVENTOR(S) : William J. Fosnight et al.

It is certified that error appears in the above-identified patent and that said Letters Patent is hereby corrected as shown below:

In the Claims

In Column 8, Claim 13, Line 20, delete “as at” and insert -- is at --, therefor.

Signed and Sealed this
Ninth Day of January, 2024

Katherine Kelly Vidal

Katherine Kelly Vidal
*Director of the United States Patent and Trademark Office*